(12) United States Patent
Miyoshi et al.

(10) Patent No.: US 7,386,226 B2
(45) Date of Patent: Jun. 10, 2008

(54) STEREO CAMERA SYSTEM AND STEREO OPTICAL MODULE

(75) Inventors: Takashi Miyoshi, Atsugi (JP); Akio Kosaka, Hachioji (JP); Hidekazu Iwaki, Hachioji (JP); Kazuhiko Arai, Hachioji (JP)

(73) Assignee: Olympus Corporation, Tokyo (JP)

( * ) Notice: Subject to any disclaimer, the term of this patent is extended or adjusted under 35 U.S.C. 154(b) by 24 days.

(21) Appl. No.: 11/288,647

(22) Filed: Nov. 29, 2005

(65) Prior Publication Data

US 2006/0077543 A1 Apr. 13, 2006

Related U.S. Application Data

(63) Continuation of application No. PCT/JP2004/007759, filed on May 28, 2004.

(30) Foreign Application Priority Data

| May 29, 2003 | (JP) | ............................. 2003-153452 |
| May 29, 2003 | (JP) | ............................. 2003-153453 |
| May 29, 2003 | (JP) | ............................. 2003-153454 |

(51) Int. Cl.
*G03B 35/08* (2006.01)
*H04N 13/02* (2006.01)
*G01C 5/00* (2006.01)

(52) U.S. Cl. ..................... 396/89; 396/325; 348/47; 348/139; 356/3.14

(58) Field of Classification Search ................ 396/89, 396/324, 325, 331; 348/47, 148, 46, 135, 348/139; 382/104; 356/3.14
See application file for complete search history.

(56) References Cited

U.S. PATENT DOCUMENTS

| 5,650,944 | A | * | 7/1997 | Kise | .......................... 700/304 |
| 6,507,358 | B1 | * | 1/2003 | Mori et al. | .................... 348/42 |
| 6,734,787 | B2 | * | 5/2004 | Ikeda | ....................... 340/425.5 |
| 6,907,139 | B2 | * | 6/2005 | Yamamoto | .................. 382/154 |
| 6,985,075 | B2 | * | 1/2006 | Takeda | ........................ 340/435 |
| 2004/0201672 | A1 | * | 10/2004 | Varadarajan et al. | ......... 348/148 |
| 2006/0072914 | A1 | * | 4/2006 | Arai et al. | .................... 396/106 |
| 2006/0082879 | A1 | * | 4/2006 | Miyoshi et al. | ............. 359/462 |

FOREIGN PATENT DOCUMENTS

| JP | 6-273171 | 9/1994 |
| JP | 10-26528 | 1/1998 |
| JP | 11-146425 | 5/1999 |
| JP | 11-211469 | 8/1999 |
| JP | 11-328413 | 11/1999 |
| JP | 2001-088609 | 4/2001 |
| JP | 2002-259966 | 9/2002 |

\* cited by examiner

*Primary Examiner*—W. B. Perkey
(74) *Attorney, Agent, or Firm*—Straub and Pokotylo; John C. Pokotylo

(57) ABSTRACT

This stereo camera system is constituted of a stereo optical module which acquires a stereo image, a central control unit which evaluates an object as a target based on the stereo image acquired by the stereo optical module, and a communication line through which stereo image data output from the stereo optical module is input to the central control unit. Further, in this stereo camera system, an image output processing circuit which performs predetermined image processing with respect to the stereo image acquired by the stereo optical module is provided in the stereo optical module, whereby this image output processing circuit performs a correction arithmetic operation which corrects unbalance at the time of capturing the stereo image.

26 Claims, 25 Drawing Sheets

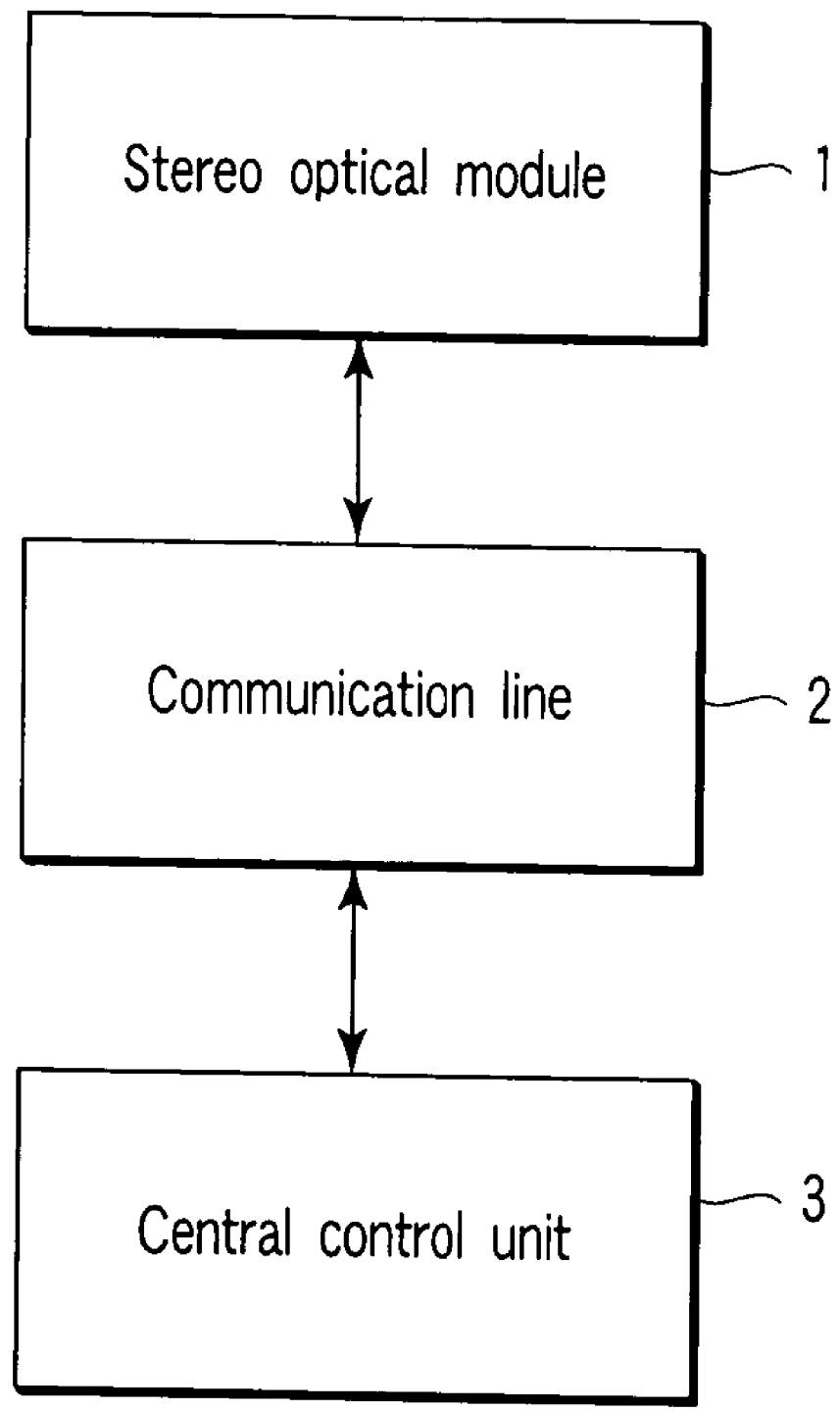
F I G. 1

STEREO CAMERA SYSTEM AND STEREO OPTICAL MODULE

CROSS REFERENCE TO RELATED APPLICATIONS

This is a Continuation Application of PCT Application No. PCT/JP2004/007759, filed May 28, 2004, which was published under PCT Article 21(2) in Japanese.

This application is based upon and claims the benefit of priority from prior Japanese Patent Applications No. 2003-153452, filed May 29, 2003; No. 2003-153453, filed May 29, 2003; and No. 2003-153454, filed May 29, 2003, the entire contents of all of which are incorporated herein by reference.

BACKGROUND OF THE INVENTION

1. Field of the Invention

The present invention relates to a stereo camera system and a stereo optical module which can be mounted in a mobile body such as a vehicle, a marine vessel, an aircraft or a robot, or a non-mobile body such as a monitoring camera system.

2. Description of the Related Art

Various kinds of propositions have been made with respect to an imaging device which captures a so-called stereo image including left and right two images having parallaxes in one image.

For example, Jpn. Pat. Appln. KOKAI Publication No. 211469-1999 proposes a stereo image processing system in which a stereo imaging unit (a stereo optical module) which captures a stereo image by using a pair of cameras is combined with an image processing unit (a central control unit) which processes a captured stereo image. A nonvolatile memory which stores camera characteristic data is provided in this stereo imaging unit in order to correct irregularities in characteristics of the pair of cameras. Further, when such a stereo imaging unit and a stereo image processing unit are connected with each other through a communication line, correction data stored in the nonvolatile memory can be transferred/output to the stereo image processing unit through the communication line. Further, stereo image data imaged by the cameras in the stereo imaging unit is output as analog type video signals to the stereo image processing unit through the communication line, and a correction arithmetic operation is performed in the stereo image processing unit based on these analog type video signals and the correction data input from the stereo imaging unit.

Furthermore, Jpn. Pat. Appln. KOKAI Publication No. 328413-1999 proposes an imaging device (a stereo optical module) which is connected with an image processing unit (a central control unit) through a one-system analog image signal cable, thereby selectively transmitting each stereo image by using this image signal cable.

Moreover, Jpn. Pat. Appln. KOKAI Publication No. 2001-88609 proposes a vehicle-mounted camera which can transmit an output from a temperature sensor to an image recognition device through a serial communication line by connecting the vehicle-mounted camera (a stereo optical module) with the image recognition device (a central control unit) by using a video signal line and the serial communication line and further having mounted the temperature sensor which detects a temperature in the vehicle-mounted camera.

Additionally, Jpn. Pat. Appln. KOKAI Publication No. 2002-259966 proposes a system comprising a plurality of vehicle-mounted cameras (stereo optical modules) and a periphery recognition device (a central control unit).

BRIEF SUMMARY OF THE INVENTION

A stereo camera system according to a first aspect of the present invention is a stereo camera system which shoots object images seen from a plurality of viewpoints with respect to the same object to obtain a distance to the object as a target, comprising:

a stereo optical module which acquires a stereo image;

a central control unit which evaluates the object as a target based on the stereo image acquired by the stereo optical module; and a communication line through which the stereo image data acquired by the stereo optical module is input to the central control unit, wherein the stereo optical module comprises: a stereo optical system which generates object images seen from a plurality of viewpoints with respect to the same object; an imaging element which generates stereo image data based on the object images generated by the stereo optical system; an analog-to-digital converting section which subjects the stereo image data generated by the imaging element to analog-to-digital conversion to thereby generate digital stereo image data; an image output processing circuit which performs predetermined image processing to the digital stereo image data generated by the analog-to-digital converting section; and a module side communication interface which outputs stereo image data subjected to image processing by the image output processing circuit, and the central control unit comprises: a unit side communication interface which inputs the stereo image data output through the module side communication interface; and a range image evaluation device which obtains a distance to the object as a target based on the stereo image data input through the unit side communication interface, in order to evaluate the object based on the stereo image obtained by the stereo optical module.

A stereo optical module according to a second aspect of the present invention is a stereo optical module for use in a stereo camera system which comprises: the stereo optical module which obtains a stereo image; a central control unit which evaluates an object as a target based on the stereo image obtained by the stereo optical module; and a communication line through which stereo image data output from the stereo optical module is input to the central control unit, the stereo camera system shooting object images seen from a plurality of viewpoints with respect to the same object to obtain a distance to the object, the stereo optical module comprising:

a stereo optical system which generates object images seen from a plurality of viewpoints with respect to the same object;

an imaging element which generates stereo image data based on the object images generated in the stereo optical system;

an analog-to-digital converting section which subjects the stereo image data generated by the imaging element to analog-to-digital conversion to produce digital stereo image data;

an image output processing circuit which performs predetermined image processing with respect to the digital stereo image data generated by the analog-to-digital converting section; and a module side communication interface which outputs stereo image data subjected to the image processing in the image output processing circuit to the communication line.

A stereo camera system according to a third aspect of the present invention is a stereo camera system which shoots object images seen from a plurality of viewpoints with respect to the same object to obtain a distance to the object as a target, comprising:

a stereo optical module which acquires a stereo image;

a central control unit which evaluates the object as a target based on the stereo image acquired by the stereo optical module; and a communication line through which the stereo image data acquired in the stereo optical module is input to the central control unit, the stereo optical module comprising: a stereo optical system which generates object images seen from a plurality of viewpoints with respect to the same object; an imaging element which generates stereo image data based on the object images generated by the stereo optical system; an analog-to-digital converting section which subjects the stereo image data generated by the imaging element to analog-to-digital conversion to produce digital stereo image data; a correction information memory which stores calibration data of the stereo camera system; an image output processing circuit which performs predetermined image processing based on the digital stereo image data generated by the analog-to-digital converting section and the calibration data stored in the correction information memory; and a module side communication interface which outputs stereo image data subjected to the image processing by the image output processing circuit to the communication line, and the central control unit comprising: a unit side communication interface which inputs to the central control unit the stereo image data output to the communication line through the module side communication interface; and a range image evaluation device which obtains a distance to the object as a target based on the stereo image data input through the unit side communication interface.

A stereo optical module according to a fourth aspect of the present invention is a stereo optical module for use in a stereo camera system which shoots object images seen from a plurality of viewpoints with respect to the same object to obtain a distance to the object as a target, the stereo camera system comprising: the stereo optical module which obtains a stereo image; a central control unit which evaluates the object as a target based on the stereo image obtained by the stereo optical module; and a communication line through which stereo image data output from the stereo optical module is input to the central control unit, the stereo optical module comprising:

a stereo optical system which generates object images seen from a plurality of viewpoints with respect to the same object;

an imaging element which generates stereo image data based on the object images generated in the stereo optical system;

an analog-to-digital converting section which subjects the stereo image data generated by the imaging element to analog-to-digital conversion to produce digital stereo image data;

a correction information memory which stores calibration data of the stereo camera system;

an image output processing circuit which performs predetermined image processing based on the digital stereo image data generated by the analog-to-digital converting section and the calibration data stored in the correction information memory; and a module side communication interface which outputs stereo image data subjected to the image processing in the image output processing circuit to the communication line.

A stereo camera system according to a fifth aspect of the present invention is a stereo camera system which shoots object images seen from a plurality of viewpoints with respect to the same object to obtain a distance to the object as a target, comprising:

a stereo optical module which acquires a stereo image;

a central control unit which evaluates the object as a target based on the stereo image acquired by the stereo optical module; and a communication line through which the stereo image data acquired in the stereo optical module is input to the central control unit, the stereo optical module comprising: a stereo optical system which generates object images seen from a plurality of viewpoints with respect to the same object; an imaging element which generates stereo image data based on the object images generated by the stereo optical system; an analog-to-digital converting section which subjects the stereo image data generated by the imaging element to analog-to-digital conversion to produce digital stereo image data; a correction information memory which stores calibration data of the stereo camera system, the calibration data including first calibration data and second calibration data; an image output processing circuit which performs predetermined image processing based on the digital stereo image data generated by the analog-to-digital converting section and the first calibration data stored in the correction information memory; and a module side communication interface which outputs stereo image data subjected to the image processing by the image output processing circuit and the second calibration data stored in the correction information memory to the communication line, and the central control unit comprising: a unit side communication interface which inputs to the central control unit the stereo image data output to the communication line through the module side communication interface; and a range image evaluation device which obtains a distance to the object as a target based on the stereo image data and the second calibration data input through the unit side communication interface.

A stereo optical module according to a sixth aspect of the present invention is a stereo optical module for use in a stereo camera system which shoots object images seen from a plurality of viewpoints with respect to the same object to obtain a distance to the object as a target, the stereo camera system comprising: the stereo optical module which acquires a stereo image; a central control unit which evaluates the object as a target based on the stereo image acquired by the stereo optical module; and a communication line through which stereo image data output from the stereo optical module is input to the central control unit, the stereo optical module comprising: a stereo optical system which generates object images seen from a plurality of viewpoints with respect to the same object; an imaging element which generates stereo image data based on the object images produced by the stereo optical system; an analog-to-digital converting section which subjects the stereo image data generated by the imaging element to analog-to-digital conversion to produce digital stereo image data; a correction information memory which stores calibration data of the stereo camera system, the calibration data including first calibration data and second calibration data; an image output processing circuit which performs predetermined image processing based on the digital stereo image data generated by the analog-to-digital converting section and the first calibration data stored in the correction information memory; and a module side communication interface which outputs stereo image data subjected to the image processing by the image output processing circuit and the second calibration data stored in the correction information memory.

A stereo camera system according to a seventh aspect of the present invention is a stereo camera system which shoots object images seen from a plurality of viewpoints with respect to the same object to obtain a distance to the object as a target, comprising:

a stereo optical module which acquires a stereo image; a central control unit which evaluates the object as a target based on the stereo image acquired by the stereo optical module; and a communication line through which data concerning the stereo image acquired by the stereo optical module is input to the central control unit, the stereo optical module comprising: a stereo optical module which generates object images seen from a plurality of viewpoints with respect to the same object; an imaging element which generates stereo image data based on the object images produced by the stereo optical system; an analog-to-digital converting section which subjects the stereo image data generated by the imaging element to analog-to-digital conversion to produce digital stereo image data; an image output processing circuit which performs predetermined image processing with respect to the digital stereo image data generated by the analog-to-digital converting section; a range image calculation unit which generates range image data based on stereo image data subjected to the image processing by the image output processing circuit; and a module side communication interface which outputs the range image data generated by the range image calculation unit to the communication line, and the central control unit comprising: a unit side communication interface which inputs the range image data output through the module side communication interface; and a range image evaluation device which evaluates the object based on the range image data input through the unit side communication interface.

A stereo optical module according to an eighth aspect of the present invention is a stereo optical module for use in a stereo camera system which shoots object images seen from a plurality of viewpoints with respect to the same object to obtain a distance to the object as a target, the stereo camera system comprising: the stereo optical module which acquires a stereo image; a central control unit which evaluates the object as a target based on the stereo image acquired by the stereo optical module; and a communication line through which data concerning the stereo image output from the stereo optical module is input to the central control unit, the stereo optical module comprising:

a stereo optical system which generates object images seen from a plurality of viewpoints with respect to the same object;

an imaging element which generates stereo image data based on the object images generated in the stereo optical system;

an analog-to-digital converting section which subjects the stereo image data generated by the imaging element to analog-to-digital conversion to generate digital stereo image data;

an image output processing circuit which performs predetermined image processing with respect to the digital stereo image data generated by the analog-to-digital converting section;

a range image calculation unit which generates range image data based on stereo image data subjected to the image processing by the image output processing circuit; and a module side communication interface which outputs the range image data generated by the range image calculation unit to the communication line.

A stereo camera system according to a ninth aspect of the present invention is a stereo camera system which shoots object images seen from a plurality of viewpoints with respect to the same object to obtain a distance to the object as a target, comprising:

a stereo optical module which comprises: a stereo optical system which generates object images seen from a plurality of viewpoints with respect to the same object; an imaging element which generate stereo image data based on the object images generated by the stereo optical system; an analog-to-digital converting section which subjects the stereo image data to analog-to-digital conversion by the imaging element to generate digital stereo image data; an image output processing circuit which performs predetermined image processing with respect to the digital stereo image data generated by the analog-to-digital converting section; a range image calculation unit which generates range image data based on stereo image data subjected to image processing by the image output processing circuit; and a module side communication interface which outputs at least one of the range image data generated by the range image calculation unit and the stereo image data;

a central control unit which comprises: a unit side communication interface which inputs at least one of the range image data and the stereo image data; and a range image evaluation device which evaluates the object based on at least one of the range image data and the stereo image data input through the unit side communication interface; and a communication line which connects the module side communication interface with the unit side interface to enable data communication between the stereo optical module and the central control unit.

A stereo optical module according to a tenth aspect of the present invention is a stereo optical module comprising:

a stereo optical system which generates object images seen from a plurality of viewpoints with respect to the same object;

an imaging element which generates stereo image data based on the object images generated by the stereo optical system;

an analog-to-digital converting section which subjects the stereo image data generated by the imaging element to analog-to-digital conversion to produce digital stereo image data;

an image output processing circuit which performs predetermined image processing with respect to the digital stereo image data generated by the analog-to-digital converting section;

a range image calculation unit which generates range image data based on stereo image data subject to the image processing by the image output processing circuit; and a module side communication interface which outputs at least one of the range image data generated by the range image calculation unit and the stereo image data generated by the imaging element to the communication line.

A stereo optical camera system according to an eleventh aspect of the present invention is a stereo camera system which shoots object images seen from a plurality of viewpoints with respect to the same object to obtain a distance to the object as a target, comprising:

a stereo optical module which acquires a stereo image; a central control unit which evaluates the object as a target based on the stereo image obtained by the stereo optical module; and a communication line through which data concerning the stereo image acquired by the stereo optical module is input to the central control unit, wherein the stereo optical module comprises: a stereo optical system which generates object images seen from a plurality of viewpoints with respect to the same object; an imaging element which generates stereo image data based on the object images produced by the stereo optical system; an analog-to-digital converting section which subjects the stereo image data generated by the imaging element to analog-to-digital conversion to produce digital stereo image data; a range image calculation unit which generates range image data based on the digital stereo image data produced by the analog-to-digital converting section; and a module side communication interface which outputs the range image data generated by the range image calculation unit to the communication line, and the central control unit comprises: a unit side communication interface which inputs the range image data output through the module side communication interface; and a range image evaluation device which evaluates the object based on the range image data input through the unit side communication interface.

A stereo optical module according to a twelfth aspect of the present invention is a stereo optical module for use in a stereo camera system which shoots object images seen from a plurality of viewpoints with respect to the same object to obtain a distance to the object as a target, the stereo camera system comprising: the stereo optical module which acquires a stereo image; a central control unit which evaluates the object as a target based on the stereo image acquired by the stereo optical module; and a communication line through which data concerning the stereo image output from the stereo optical module is input to the central control unit, the stereo optical module comprising:

a stereo optical system which generates object images seen from a plurality of viewpoints with respect to the same object;

an imaging element which generates stereo image data based on the object images produced by the stereo optical system;

an analog-to-digital converting section which subjects the stereo image data generated by the imaging element to analog-to-digital conversion to produce digital stereo image data;

a range image calculation unit which generates range image data based on the digital stereo image data produced by the analog-to-digital converting section; and a module side communication interface which outputs the range image data generated by the range image calculation unit to the communication line.

A stereo camera system according to a thirteenth aspect of the present invention is a stereo camera system which shoots object images seen from a plurality of viewpoints with respect to the same object to obtain a distance to the object as a target, comprising:

a stereo optical module which acquires a stereo image; a central control unit which evaluates the object as a target based on data concerning the stereo image acquired by the stereo optical module; and a communication line which allows communication between the stereo optical module and the central control unit by using a digital signal, wherein the stereo optical module comprises: a stereo optical system which generates object images seen from a plurality of viewpoints with respect to the same object; an imaging element which generates stereo image data based on the object images produced by the stereo optical system; an analog-to-digital converting section which subjects the stereo image data generated by the imaging element to analog-to-digital conversion to produce digital stereo image data; and a module side communication interface which outputs information concerning the stereo image acquired by the stereo optical module to the communication line upon receiving a control command from the central control unit, and the central control unit comprises: a unit side communication interface which inputs the information concerning the stereo image output through the module side communication interface, and outputs a control command from the central control unit to the stereo optical module; and a range image evaluation device which evaluates the object based on the information concerning the stereo image input through the unit side communication interface.

A stereo optical module according to a fourteenth aspect of the present invention is a stereo optical module comprising:

a stereo optical system which generates object images seen from a plurality of viewpoints with respect to the same object;

an imaging element which generates stereo image data based on the object images produced by the stereo optical system; and an analog-to-digital converting section which subjects the stereo image data generated by the imaging element to analog-to-digital conversion to produce digital stereo image data, wherein information concerning the stereo image is output to a communication line in response to an externally input control command.

A stereo camera system according to a fifteenth aspect of the present invention is a stereo camera system which shoots object images seen from a plurality of viewpoints with respect to the same object to obtain a distance to the object as a target, comprising:

at least one stereo optical module which acquires a stereo image;

at least one optical module which acquires an image different from that of the stereo optical module;

a central control unit which performs sequence control over the stereo optical module and the optical module; and a communication line which connects the stereo optical module, the optical module and the central control unit with each other for communication.

BRIEF DESCRIPTION OF THE SEVERAL VIEWS OF THE DRAWING

FIG. 1 is a block diagram showing a basic configuration of a stereo camera system according to a first embodiment of the present invention;

DETAILED DESCRIPTION OF THE INVENTION

Embodiments according to the present invention will now be described hereinafter with reference to the accompanying drawings.

First Embodiment

FIG. 1 is a block diagram showing a basic configuration of a stereo camera system according to a first embodiment of the present invention. Here, this stereo camera system is assumed as a system which can be mounted in a mobile body such as a vehicle, a marine vessel, an aircraft or a robot. An example in which such a system is mounted in a vehicle will be described hereinafter with reference to FIGS. 1 to 9.

That is, this camera system is basically constituted of a stereo optical module 1, a communication line 2 and a central control unit 3 as shown in FIG. 1. The stereo optical module 1 images an object to acquire a stereo image, and corrects the acquired stereo image. The communication line 2 is a communication line between the stereo optical module 1 and the central control unit 3. The central control unit 3 evaluates an object as a shooting target of the stereo optical module 1 based on a stereo image input from the stereo optical module 1 through the communication line 2. Specifically, it obtains a later-described range image based on an input stereo image, and evaluates this obtained range image.

These structures will now be described in detail hereinafter.

Figure 2:
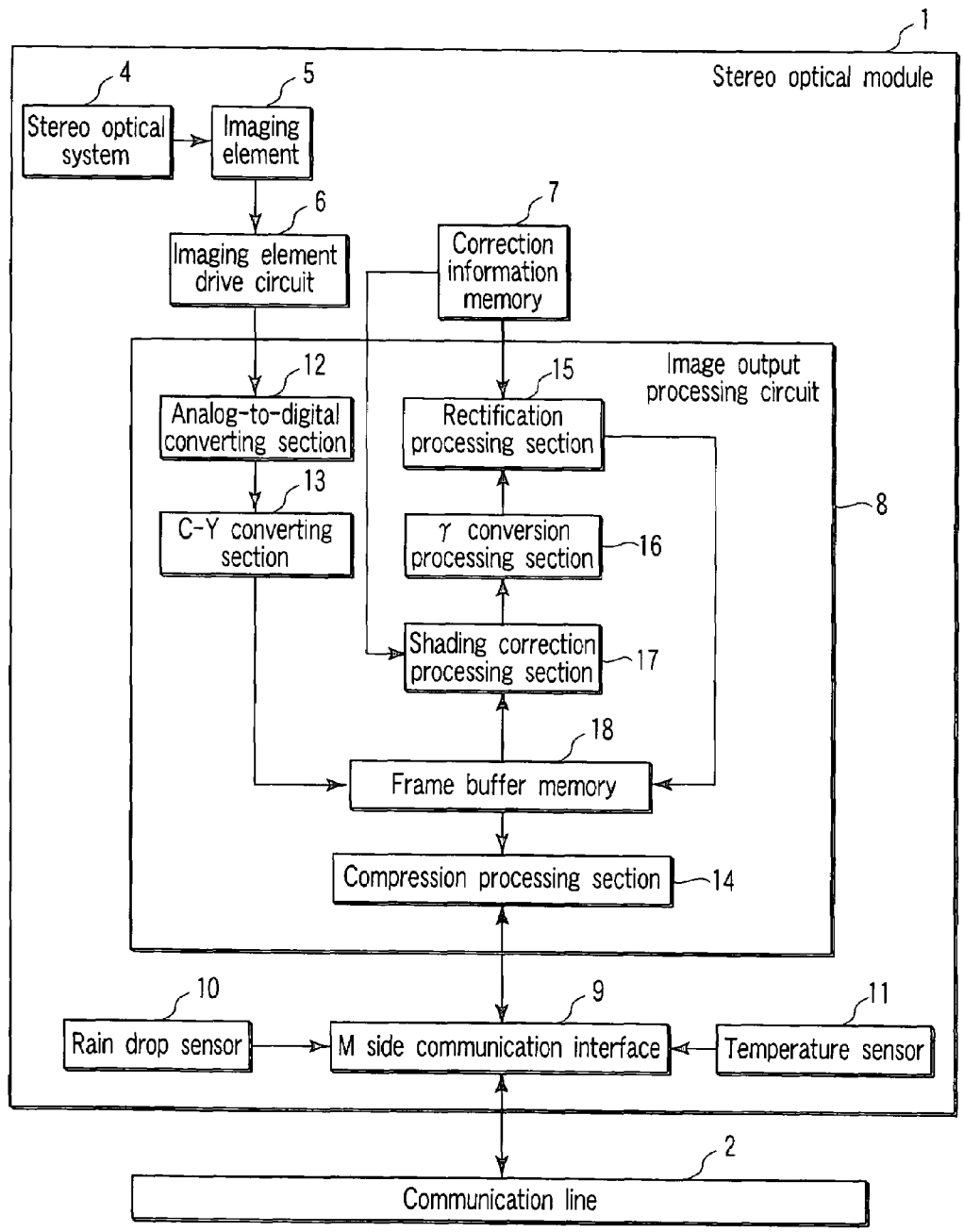
FIG. 2 is a block diagram showing a circuit configuration of the stereo optical module in the first embodiment.

The stereo optical module 1 will be first explained. FIG. 2 is a block diagram showing the inside of this stereo optical module in detail. That is, the stereo optical module 1 is, as shown in FIG. 2, constituted of a stereo optical system 4, an imaging element 5, an imaging element drive circuit 6, a correction information memory 7, an image output processing circuit 8, a module (M) side communication interface 9, a rain drop sensor 10, and a temperature sensor 11.

Figure 3A:
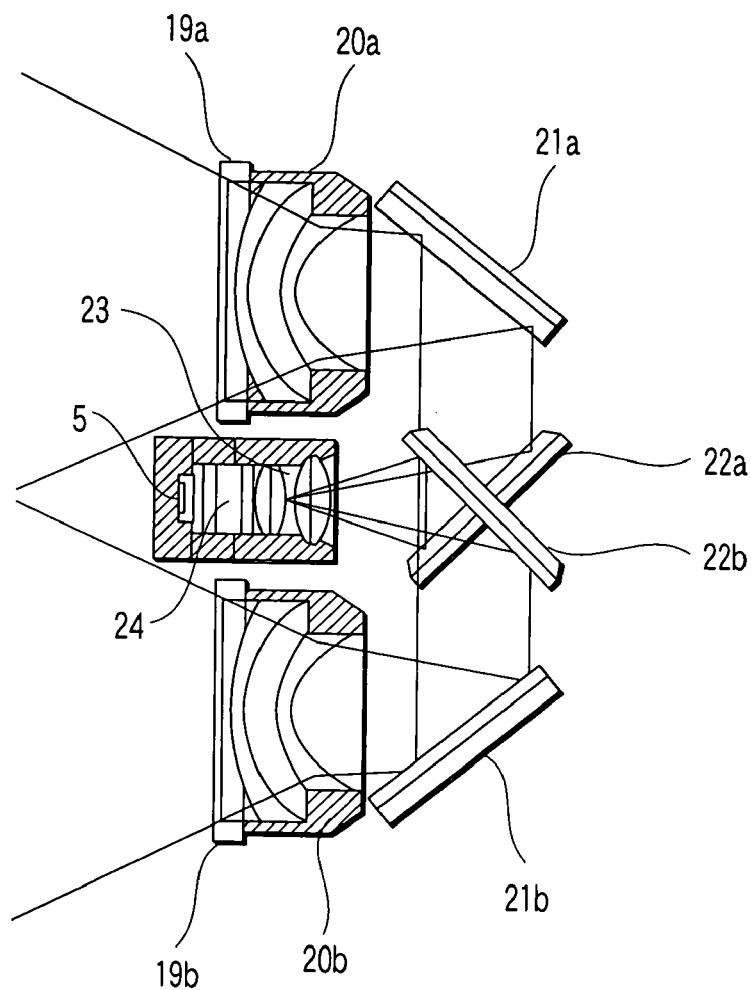
FIG. 3A is a top view showing a configuration of a stereo optical system of the stereo optical module.

As shown in FIG. 3A, the stereo optical system 4 comprises visual field masks (right and left) 19a and 19b, front lens units (right and left) 20a and 20b, primary deflecting mirrors (right and left) 21a and 21b, secondary deflecting mirrors (right and left) 22a and 22b, a rear lens unit 23, and a low-pass filter 24, and forms an image from a non-illustrated object on the imaging element 5.

Figure 3B:
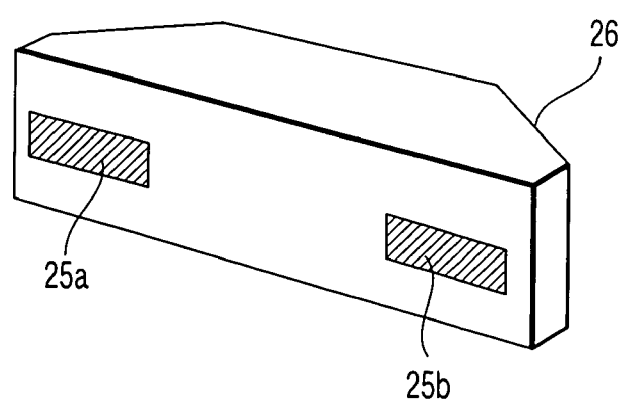
FIG. 3B is an external view of the stereo optical module.

Here, as shown in FIG. 3B, in regard to an external appearance of the stereo optical module 1, the stereo optical module 1 is covered with a casing member 26 having visual field mask openings 25a and 25b formed thereon, and light enters the stereo optical system 4 from these visual field mask openings 25a and 25b. Here, the casing member 26 is a member which protects an inner mechanism of the stereo optical module from the outside, and it is a cover member having a function which shields against external light, a dustproof function, a function which supports the inner mechanism and others.

Figure 4A:
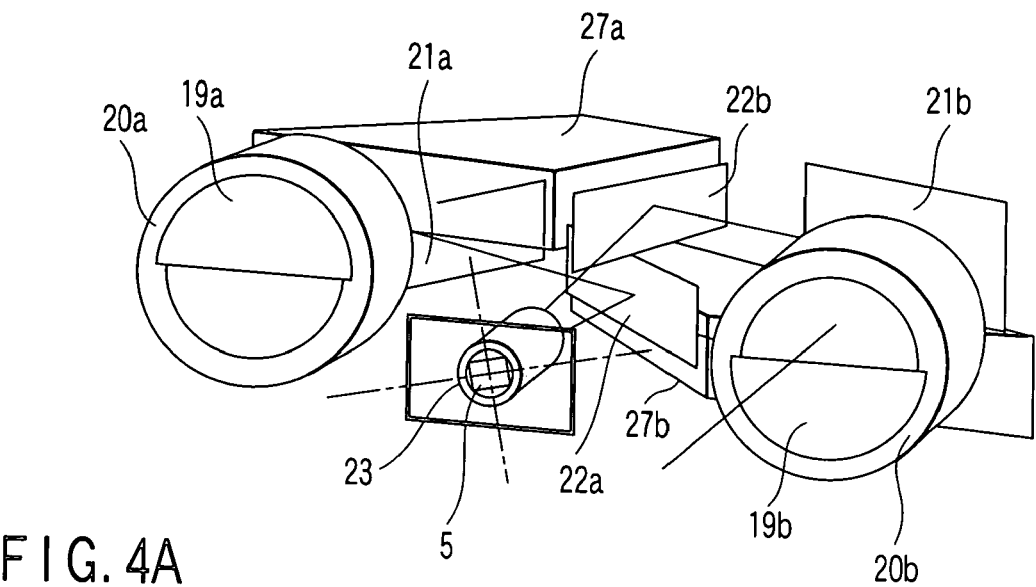
FIG. 4A is a perspective view showing a configuration of the stereo optical module.

Further, as shown in FIGS. 3A and 3B, in regard to a light beam from the non-illustrated object at a fixed distance, which has entered the stereo optical system 4 from the visual field mask openings 25a and 25b, a part of this light beam is prevented from being transmitted by the visual field masks 19a and 19b, and the remaining light beam enters the right and left front lens units 20*a* and 20*b*. Here, the visual field masks 19*a* and 19*b* function as aperture diaphragms which narrow down a visual field of each of the front lens units 20*a* and 20*b*. In the first embodiment, as shown in FIG. 4A, the visual field mask 19*a* blocks off an upper half region of the front lens unit 20*a*, and the visual field mask 19*b* blocks off a lower half region of the front lens unit 20*b*.

It is to be noted that an effective optical axis (which will be referred to as an optical axis hereinafter) of each of these front lens units 20*a* and 20*b* having the visual field masks 19*a* and 19*b* does not match with a center of a light beam from the object, i.e., a central axis when the visual field masks 19*a* and 19*b* are not provided. Furthermore, as shown in FIG. 4A, the optical axes of the right and left front lens units 20*a* and 20*b* do not exist on the same plane, and they are twisted.

The light beam from the object which has entered through the front lens units 20*a* and 20*b* is reflected by the primary deflecting mirrors 21*a* and 21*b*. Each of these primary deflecting mirrors 21*a* and 21*b* has a size with which a light beam transmitted through each of the front lens units 20*a* and 20*b* can be reflected. That is, each of the primary deflecting mirrors 21*a* and 21*b* has a size which is substantially equal to or slightly larger than a region of the front lens unit 20*a* which is not blocked off. Moreover, each of the primary deflecting mirrors 21*a* and 21*b* is obliquely arranged at an angle of 45 degrees in a horizontal direction and at an angle of several degrees toward the image element side in a vertical direction. By arranging the primary deflecting mirrors 21*a* and 21*b* in this manner, the light beam reflected by each of the primary deflecting mirrors 21*a* and 21*b* enters each of the secondary deflecting mirrors 22*a* and 22*b*.

Figure 4B:
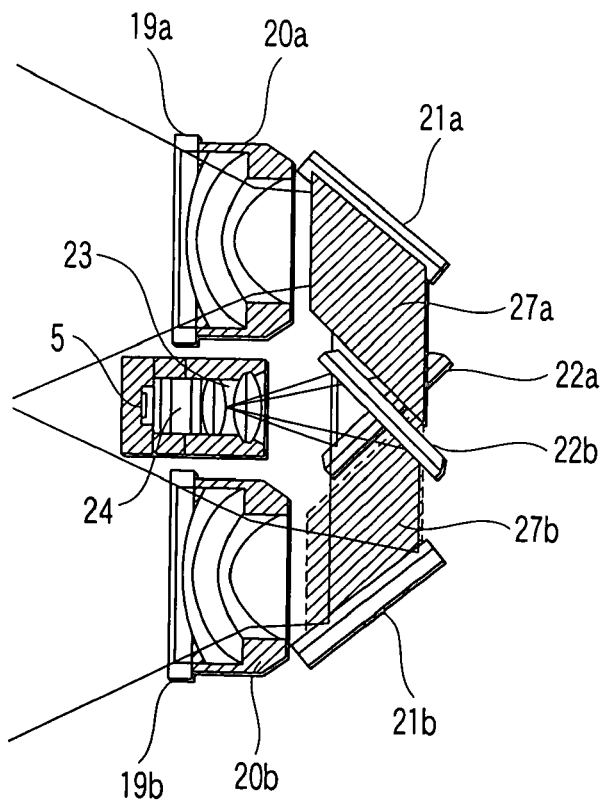
FIG. 4B is a top view illustrating a circuit arrangement in the stereo optical module.

The secondary deflecting mirrors 22*a* and 22*b* are obliquely arranged as they become substantially orthogonal to the primary deflecting mirrors 21*a* and 21*b* in the horizontal direction and arranged at an angle of several degrees toward the imaging element side in the vertical direction. By arranging the secondary deflecting mirrors 22*a* and 22*b* in this manner, the light beam reflected by each of the secondary deflecting mirrors 22*a* and 22*b* enters the rear lens unit 23. As shown in FIG. 4B, as seen from an upper face, the secondary deflecting mirrors 22*a* and 22*b* are arranged to be orthogonal to each other. That is, the incident light beam from the primary deflecting mirror 21*a* is reflected by the secondary deflecting mirror 22*a*, and deflected to enter in a downward direction of the rear lens unit 23. On the other hand, the incident light beam from the primary deflecting mirror 21*b* is reflected by the secondary deflecting mirror 22*b*, and deflected to enter in an upper direction of the rear lens unit 23.

Figure 5:
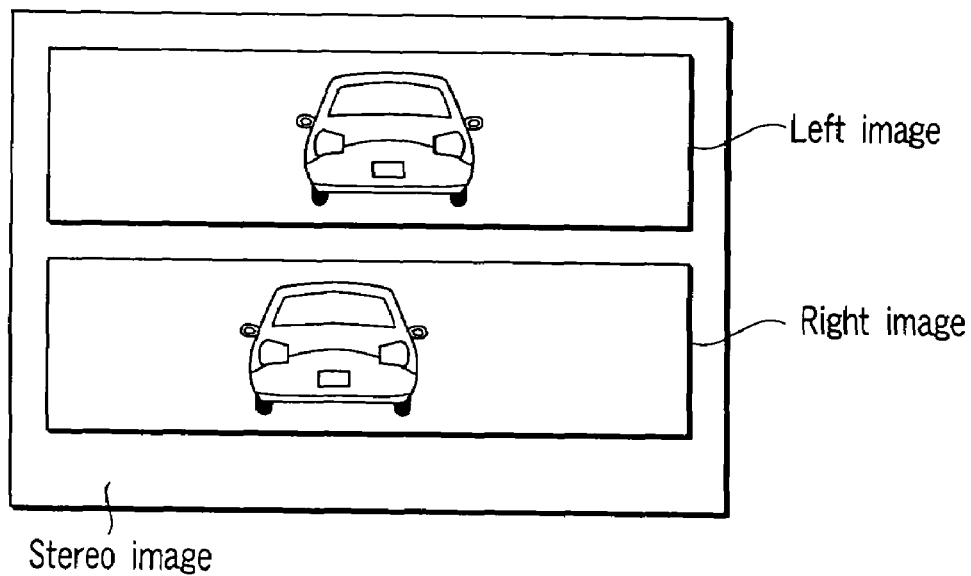
FIG. 5 is a view showing an example of a stereo image.

The thus deflected light beam enters the low-pass filter 24 through the rear lens unit 23, and its high-frequency noise component is removed by the low-pass filter. Then, the light beam which has entered through the right front lens unit 20*a* is image-formed in the lower half region of the imaging element 5, and the light beam which has entered through the left front lens unit 20*b* is image-formed in the upper half region of the imaging element 5. That is, restricting a visual field by the visual field masks 19*a* and 19*b* forms upper and lower images on the imaging element without overlapping. As a result, such stereo images having a lateral parallax as shown in FIG. 5 are aligned and formed in the vertical direction on the imaging element. Consequently, a stereo image can be acquired by using one stereo optical module alone.

Here, since each of the secondary deflecting mirrors 22*a* and 22*b* is arranged at an angle of several degrees with respect to the imaging element 5 in the vertical direction, each image is formed at a slant with respect to an object field. Thus, in order to efficiently form an image of an incident light beam on the imaging element 5, it is preferable to arrange the imaging element 5 at a slant as shown in FIG. 4A.

The stereo image formed on the imaging element 5 in this manner is sequentially output as an analog signal to the image output processing circuit 8 by a function of the image element drive circuit 6 shown in the block diagram of FIG. 2. Here, the inside of the image output processing circuit 8 includes an analog-to-digital converting section 12, a C-Y converting section 13, a compression processing section 14, a rectification processing section 15, a γ conversion processing section 16, a shading correction processing section 17, and a frame buffer memory 18.

Further, the image output processing circuit 8, the rain drop sensor 10 and the temperature sensor 11 are, as shown in FIGS. 4A and 4B, arranged in circuit arrangement spaces 27*a* and 27*b* which are vacant spaces on rear surface sides of the secondary deflecting mirrors 22*a* and 22*b* behind the visual field mask 19*a* and 19*b*. As shown in FIGS. 4A and 4B, the circuit arrangement space 27*a* exists above the primary deflecting mirror 21*a* and the second deflecting mirror 22*a* in the right optical system, and the circuit arrangement space 27*b* exists below the primary deflecting mirror 21*b* and the secondary deflecting mirror 22*b* in the left optical system. As described above, since the upper half part of the right-hand front lens unit 20*a* is masked by the visual field mask 19*a* and the lower half part of the left-hand front lens unit 20*b* is masked by the visual field mask 19*b*, optical members are not arranged behind these visual field masks 19*a* and 19*b*, thereby providing the vacant spaces. Thus, when circuits, e.g., the image output processing circuit 8 and others are provided in such vacant spaces, the vacant spaces in the stereo optical module can be effectively utilized without preventing transmission of incident light, resulting in a reduction in size of the stereo optical module. Here, circuits which can be provided in these vacant spaces are included, e.g., an electric signal output circuit which outputs an electric signal, and an imaging element drive circuit, a peripheral circuit such as a digital memory (a correction information memory) which stores correction data, a temperature sensor, a rain drop sensor, an illuminance sensor, a GPS antenna, an ETC card system and others as well as the above-described image output processing circuits are included in such circuits. Further, a non-illustrated power supply circuit of the stereo optical module or a mechanical member may be provided in such vacant spaces. As this mechanical member, it is possible to provide, e.g., a non-illustrated adjustment mechanism which mechanically adjusts the stereo optical system. Furthermore, a non-illustrated ND filter which adjusts a light quantity which enters the stereo optical system may be configured as an insertion type, and the above-described vacant space may be used as a retraction space for this ND filter.

Each section of the image output processing circuit 8 shown in FIG. 2 will now be described. In the image output processing circuit 8, a stereo image as an analog signal is converted into digital stereo image data as digital data by the analog-to-digital converting section 12. It is to be noted that a non-illustrated optical color filter is provided on a front surface of the imaging element 5 and the imaging element 5 outputs stereo image data corresponding to each of colors R, G and B by this optical color filter. In the C-Y converting section 13, primary color signals of R, G and B are converted into a luminance signal and chrominance signals. This is preparatory processing required to convert these signals into motion-JPEG signals in a compression processing section 14. Then, these signals are stored in the frame buffer memory 18.

Stereo image data stored in this frame buffer memory 18 is input to the shading correction processing section 17. The shading correction processing section 17 performs shading correction processing based on the shading correction data stored in the correction information memory 7. Then, the $\gamma$ conversion processing section 16 performs $\gamma$ conversion processing in order to make image input/output characteristics appropriate, and the rectification processing section 15 performs rectification processing based on calibration data stored in the correction information memory 7.

It is to be noted that the rectification processing is processing which performs image processing to correct distortion of an image due to, e.g., displacement of an epipolar line of right and left images generated by mechanical displacement of an optical member or the like in the stereo optical system 4 or distortion of a lens. In such processing, for example, a position of a point in a right image corresponding to a characteristic point selected in a left image is detected, an amount of displacement from a straight line (the epipolar line) on which this corresponding point should essentially exist is detected, and image deformation corresponding to this detected displacement is performed. Right and left images subjected to rectification processing in this manner (which will be referred to as rectification images hereinafter) are normalized in a specified coordinate, and then again written in the frame buffer memory 18 in a state where they are vertically arranged as shown in FIG. 5.

Further, in regard to calibration data stored in the correction information memory 7, a plurality of sets of calibration data which are used to consider thermal deformation or the like of the stereo optical module are stored. That is, a temperature value detected by the temperature sensor 11 is input to the image output processing circuit 8 through the M side communication interface 9, and the rectification processing section 15 selects calibration data stored in the correction information memory 7 based on this input temperature to execute rectification processing, thereby realizing processing which is robust with respect to a change in temperature.

Then, the digital stereo image data again written in the frame buffer member 18 is input to the compression processing section 14, subjected to data compression by using a data compression scheme such as motion-JPEG, and then output to the communication line 2 through the M side communication interface 9. Furthermore, the rain drop sensor 10 and the temperature sensor 11 are also connected with the M side communication interface 9 so that outputs from these sensors can be output to the communication line 2 or the image output processing circuit 8.

The communication line 2 will now be described. In the first embodiment, the communication line 2 has a plurality of USB communication lines through which rectification image data and a data signal which is required to control the stereo optical module are transmitted. These communication lines are respectively connected with the M side communication interface 9 of the stereo optical module 1 and a unit (u) side communication interface 28 of the central control unit 3.

Here, a rectification image is compressed in the motion-JPEG format and transmitted to the USB signal lines, and information, e.g., environmental information such as rain drop sensor information detected by the rain drop sensor 10 or temperature sensor information detected by the temperature sensor 11 or photometric information of an object is also transmitted through the USB communication lines. Moreover, such information is transmitted to the central control unit 3 through the communication line 2. Here, since the stereo image data is compressed by the compression processing section 14, an information quantity at the time of communication can be reduced, and an information quantity with which data other than the image data can be transmitted/received can be increased. Here, the communication line 2, i.e., the USB communication lines transmit data of the rectification image, the rain drop sensor information, the temperature sensor information and others to the central control unit 3 from the stereo optical module 1 in the form of digital data as described above. Here, the stereo optical module 1 includes a temperature sensor, a rain drop sensor, a correction information memory and others which generate predetermined data in response to a control command from the central control unit 3. The communication line 2 is a bi-directional digital communication line, and various kinds of control commands are transmitted from the central control unit 3 to the stereo optical module 1 through this communication line 2. Although the detailed description of the control commands is eliminated in the first embodiment, they are, e.g., a power supply control command (a command which is used to switch an operating mode and an energy saving mode) of the stereo optical module 1, a request signal which is used to read the temperature sensor information or the rain drop sensor information to the central control unit side, or a request signal which is used to read information stored in the correction information memory 7 to the central control unit 3 side. In this manner, mutual data communication can be efficiently performed by using the one-system communication line.

Additionally, as a modification of the first embodiment, data of a rectification image can be transmitted through an analog communication line. For example, an output from the imaging element 5 is converted into an analog image signal conforming to a format such as NTSC by the M side communication interface 9 on the module side, and then output to the communication line 2. In this case, the compression processing section 14 is not required in the stereo optical module. As characteristics of this modification, the communication line 2 must have two systems, i.e., an analog communication line and a digital communication line, and a space is additionally required in a part where the communication line is laid. Further, there is a demerit, e.g., necessity of additional space occupied by a communication connector, whereas there occurs a merit that an image data transmission speed can be increased.

Furthermore, when transmitting a rectification image through the analog communication line, control data other than the image data may be transmitted by utilizing a region for character broadcasting in which information is superimposed in a blanking signal.

Figure 6:
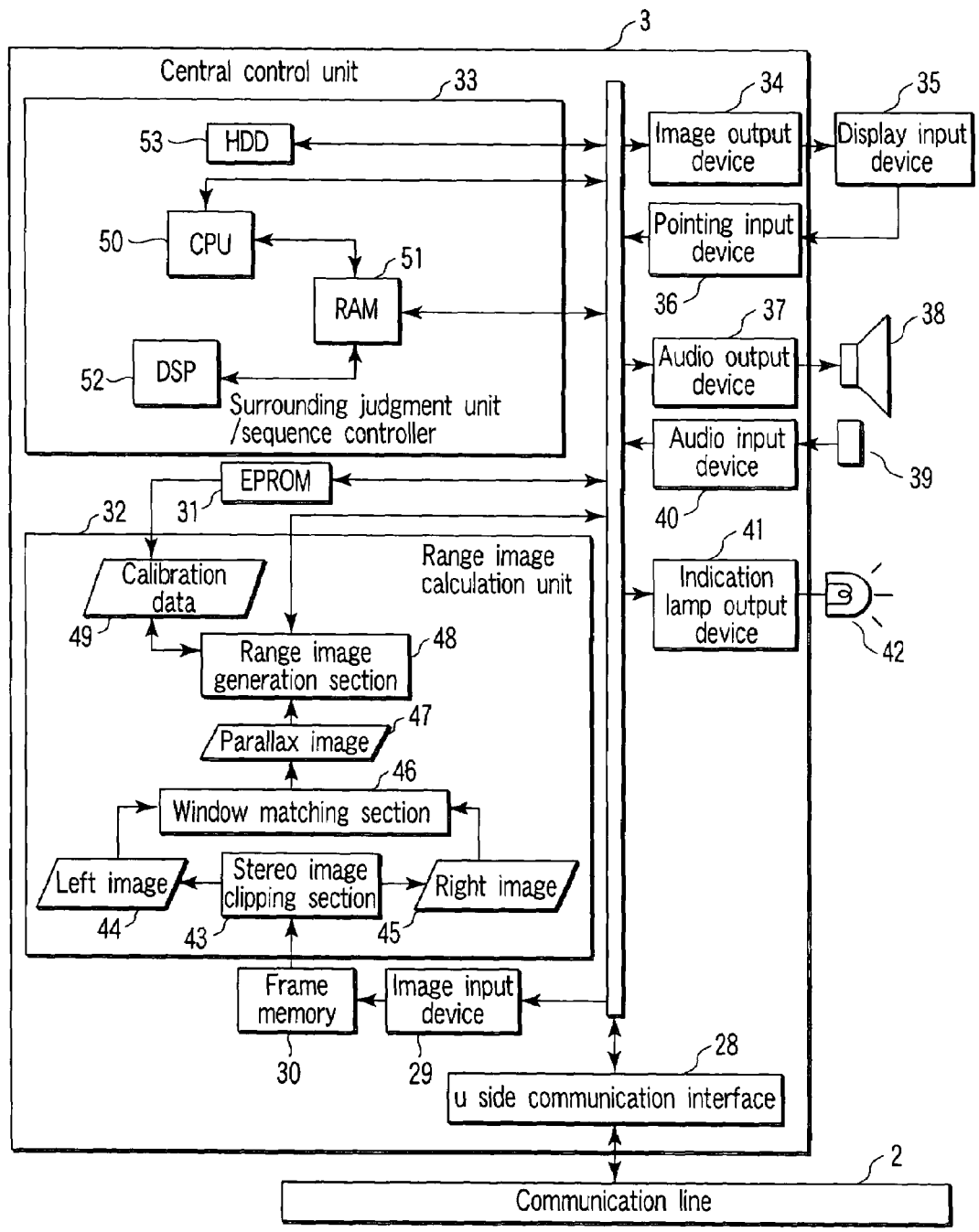
FIG. 6 is a block diagram showing a circuit configuration of a central control unit in the stereo optical module in the first embodiment of the present invention.

The central control unit 3 will now be described. As shown in FIG. 6, the central control unit 3 is constituted of a u side communication interface 28, an image input device 29, a frame memory 30, an EPROM 31, a range image calculation unit 32, and a surrounding judgment unit and sequence controller (which will be referred to as a surrounding judgment unit hereinafter) 33 as range image evaluation device which performs object recognition or the like based on a range image. Moreover, the central control unit 3 also has an image output device 34, a pointing input device 36, an audio output device 37, an audio input device 40 and an indication lamp output device 41. The above-described circuits or devices are connected with each other through a bus, and they can transfer data to each other.

Additionally, the image output device 34 and the pointing input device 36 are connected with a display input device 35. Further, the audio output device 37 is connected with a speaker 38, and the audio input device 40 is connected with a microphone 39. Furthermore, the indication lamp output device 41 is connected with an indication lamp 42.

A rectification image input to the central control unit 3 through the communication line 2 is temporarily stored in the frame memory 30 via the u side communication interface 28 and the image input device 29, and then input to the range image calculation unit 32.

Here, since the rectification image input to the central control unit 3 is data compressed based on the motion-JPEG standard, this compressed data is decompressed and restored by the image input device 29.

The range image calculation unit 32 has a stereo image clipping section 43 which clips right and left images from a stereo image and a window matching section 46. That is, the rectification image input to the range image calculation unit 32 is clipped to provide left and right images 44 and 45 by the stereo image clipping section 43. Moreover, window matching is performed with respect to the clipped left and right images 44 and 45 in the window matching section 46, and displacement of respective corresponding points, i.e., a parallax quantity is detected, thereby generating a parallax image 47. Then, this parallax quantity is converted into distance information in a range image generating section 48, and a range image is generated based on this distance information and calibration data 49 stored in the EPROM 31. Here, the term "range image" means an image having distance information in accordance with each pixel of a captured object image. Additionally, this calibration data 49 is distance information correction data which is selected in accordance with rain drop information or temperature sensor information input through the communication line 2.

Thereafter, the generated range image is transmitted to the surrounding judgment unit 33.

The surrounding judgment unit 33 has a central processing unit (CPU) 50, a main memory (RAM) 51, a digital signal processing unit (DSP) 52, a hard disk (HDD) 53 and others connected with the communication bus like a control device of a general personal computer or a microcomputer, and is configured to realize a sequence of evaluating a range image to recognize an object or other various sequence controls in the form of software.

That is, when a range image is input to the surrounding judgment unit 33, the CPU 50 develops and executes in the RAM 51 an object recognition processing program stored in the HDD 53, and performs processing of detecting an obstacle (e.g., a pedestrian, a vehicle, an fallen object or the like in a road) or recognizing characteristics surrounding information (e.g., a white line, a guard rail, a sign or the like in a road) based on a two-dimensional rectification image obtained in the stereo optical module 1 or a range image obtained in the range image calculation unit 32. Further, the CPU 50 performs control concerning driving support for drawing attention of an operator, e.g., a driver by, e.g., controlling the image output device 34 to display a recognition result in the display input device 35, controlling the audio output device 37 to inform that a vehicle is approaching by using beep sound from the speaker 38, or controlling the indication lamp output device 41 to turn on the indication lamp 42 based on a result of this recognition processing.

Furthermore, on the contrary, in a case where there is a command from an operator through a manual operation member like the display input device 35 or a sound input device like the microphone 39, this command is fetched through the pointing input device 36 or the audio input device 40, and control corresponding to contents of this command is executed.

Figure 7:
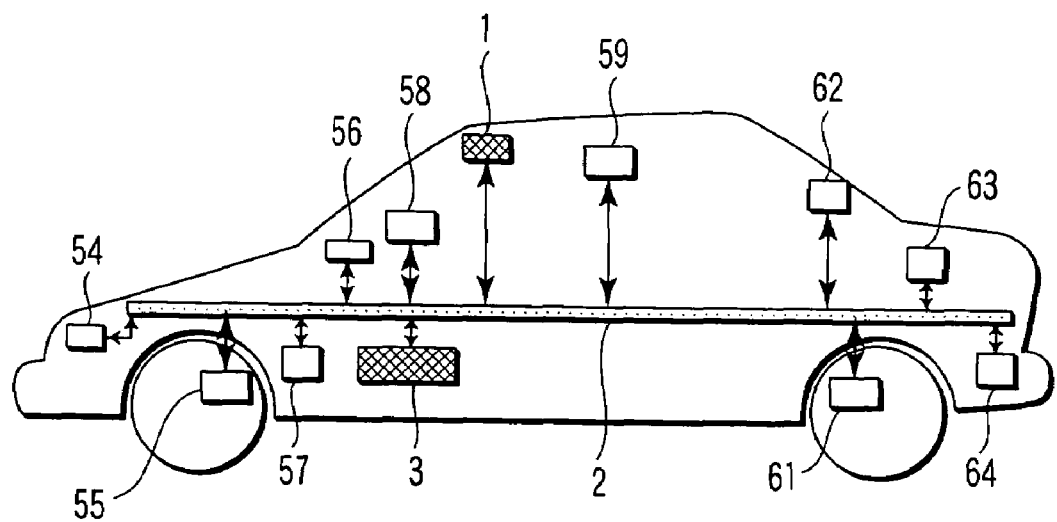
FIG. 7 is a view showing an example in which a stereo camera system according to the first embodiment is mounted in a vehicle.

When the above-described stereo camera system is mounted in a vehicle, as shown in FIG. 7, to the communication line 2 may be connected a radar module 54 having a radar device mounted therein, a vehicle speed sensor module 55 which detects a speed of a vehicle, a car navigation module 56 which informs a driver or the like of a position of the vehicle, an engine control module 57 which controls an engine, a side camera module 58 which monitors sides of the vehicle, an interior monitoring module 59 which monitors the vehicle interior, a brake sensor module 61 which controls a brake, a rear camera module 62 which monitors a rear side of the vehicle, a load detection module 63 which detects a load quantity in the vehicle, a rear ultrasonic radar module 64 having an ultrasonic radar device mounted therein and others as well as the stereo optical module 1 and the central control unit 3 so that various car-mounted modules can communicate with each other. It is to be noted that conventional modules can be used as these above-described modules.

For communication between units or modules used as a part of such a in-car network, it is possible to use, e.g., Bluetooth, IEEE 802.11 or IEEE 802.1x as a wireless communication technology. Moreover, it is also possible to use a wired network such as USB, IEEE 1394 or Ethernet, a transmission protocol of audio data such as voice over IP (VoIP), a real time messaging function (RTC/SIP client) and others, and an in-car LAN in which an IP address is allocated to each device by IPv6 or the like may be constituted. Additionally, it is also possible to use a communication bus line corresponding to open standard specifications such as an in-vehicle optical network standard "MOST" or "CAN" which is strong with respect to in-car noise or the like.

As described above, this first embodiment has the following specific effects.

That is, in this first embodiment, image processing required for the stereo optical module such as rectification, γ correction, shading correction or separation into a luminance signal and a chrominance signal is carried out in the stereo optical module. As a result, a circuit load can be reduced on the central control unit side, and specifications on the central control unit side can be simplified, thereby improving general versatility of the system.

Further, since digital image data is compressed and then transmitted, the digital image data can be transmitted at a frame rate close to that in case of analog communication.

Furthermore, since the temperature sensor 11 is provided in the stereo optical module 1, correction based on a temperature at the time of rectification processing can be appropriately carried out. Therefore, it is good enough to restrict a search region of window matching performed in the central control unit 3 to an epipolar line, thereby realizing processing at a higher speed.

It is to be noted that the respective structures in this first embodiment can be of course modified and changed in many ways.

For example, the plurality of stereo optical modules 1 described above can be used. In this case, a camera ID may be added in a rectification image obtained from each stereo optical module so that it is possible to clearly identify which stereo optical module has the corresponding rectification image.

Moreover, although the processing circuit performing processing such as γ conversion processing, C-Y conversion processing or compression processing are included in the stereo optical module 1 in the first embodiment, these functions are not necessarily required, and enabling image processing equivalent to that in a general video camera or digital still camera can suffice.

Additionally, the correction information memory 7 of the stereo optical module 1 may store correction information for rectification processing or shading correction information as well as correction information obtained by calibrating how each stereo optical module is attached in a vehicle. By doing so, the EPROM 31 in the central control unit can be eliminated, or a storage capacity can be reduced. Further, information from the central control unit 3 obtained by calibration may be transmitted to the stereo optical module 1 or the like, and this information may be stored in the stereo optical module 1. Furthermore, calibration data used in the range image calculation unit 32 of the central control unit 3 may be also stored in the correction information memory 7 of the stereo optical module 1 so that this calibration data can be transmitted from the stereo optical module 1 to the central control unit 3 at the time of range image calculation.

That is, in this modification, a part (calibration data) of correction information stored in the correction information memory 7 is used for image processing and calculation in the stereo optical module, and any other correction information is transmitted to the central control unit 3 through the communication line 2 so that it is used for correction, e.g., distance calculation on the central control unit side.

Moreover, in the central control unit 3, various processing circuits may be realized by hardware wire connection using application-specific integrated circuits (ASIC), and these circuits may be constituted of, e.g., reconfigurable processors which can be dynamically rewritten.

Additionally, the central control unit 3 may perform not only control over the stereo camera system but also transmission of information form the temperature sensor or the rain drop sensor, correction information or information of a clipping region. It is needless to say that this can be applied to not only the stereo optical module 1, the communication line 2 and the central control unit 3 but also communication between various in-vehicle modules.

Further, each communication line 2, the stereo optical module 1 and the central control unit 3 may be electrically insulated from each other through a photo coupler so that circuits are not affected by various spike noise or the like applied to a harness.

Furthermore, as a format of a video transmitted through the communication line 2, it is possible to adopt a PAL format or an SECAM format in addition to the NTSC format as long as it is an analog format, and transmission may be performed by using various kinds of compression format, e.g., a JPEG scheme which is a compression scheme for a still image, an MPEG scheme which is a compression scheme for a moving image or a digital video (DV) standard in case of a digital format.

Moreover, for input or display, it is possible to use GUI or an sound interface configured by a user interface design tool for in-vehicle devices such as Automotive UI Toolkit produced by Microsoft (registered trademark) Corporation, for example.

Figures 8A, 8B:
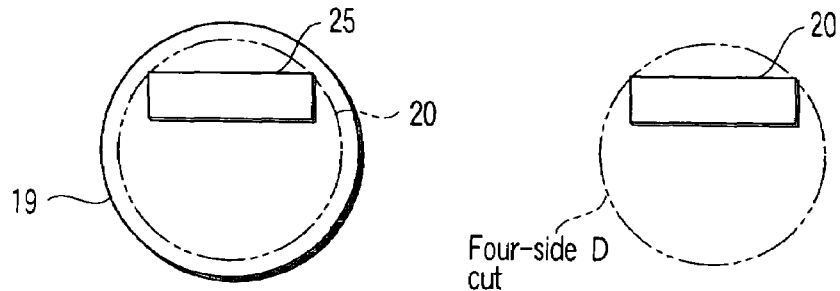
FIG. 8A is a view showing a first modification of a visual field mask.
FIG. 8B is a view showing a second modification of the visual field mask.

Additionally, although each of the visual field masks 19*a* and 19*b* has a shape which covers a half of each of the front lens units 20*a* and 20*b* in FIG. 4A, the visual field mask 19 having a square opening portion 25 may be arranged at a position offset from an optical axis of the front lens unit 20 arranged as shown in FIG. 8A in order to further effectively restrict or the lens itself may be subjected to four-side D cutting a visual field as shown in FIG. 8, thereby obtaining an effect equivalent to that when the visual field mask is arranged as shown in FIG. 8 in order to further effectively restrict.

Figure 9:
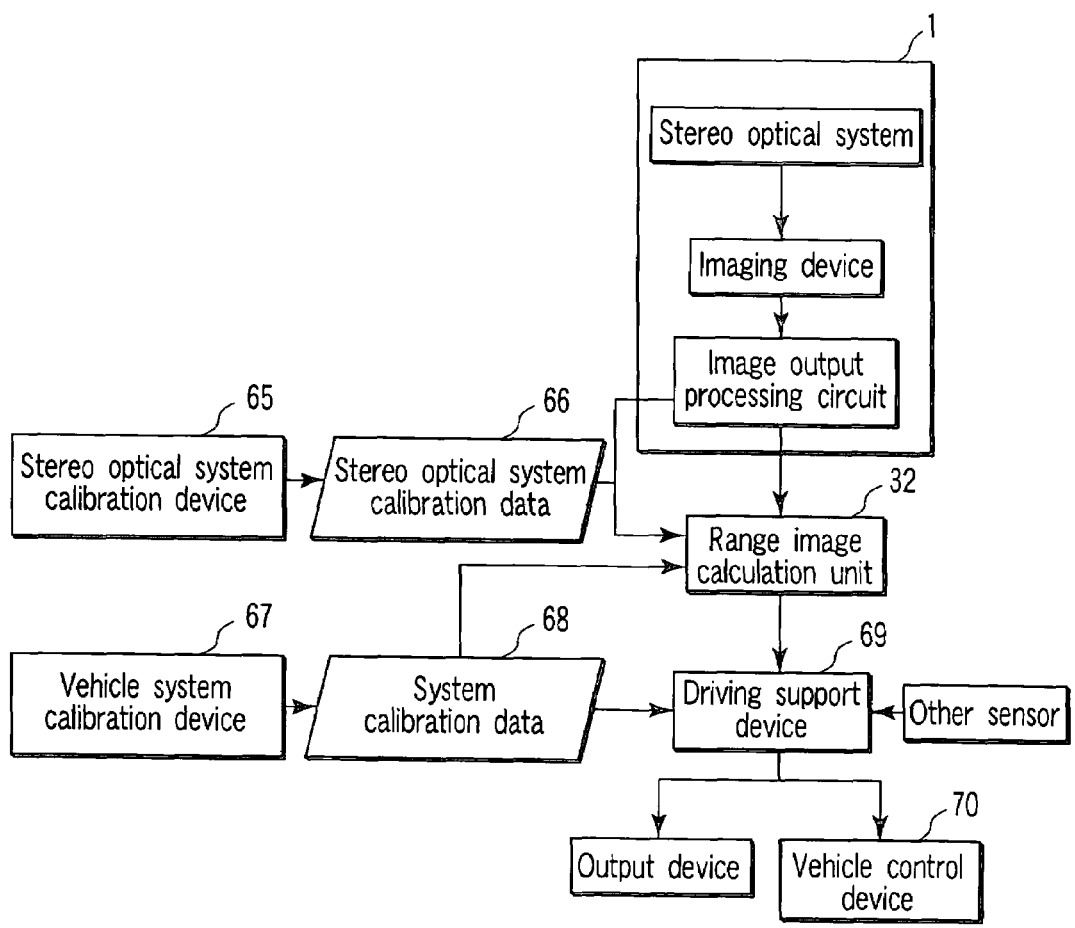
FIG. 9 is a block diagram showing a modification of the central control unit.

Further, as shown in FIG. 9, the central control unit 3 may be configured to have a stereo optical system calibration device 65 which calculates calibration data 66 of the stereo optical system or a vehicle system calibration device 67 which carries out vehicle system calibration which measures a positional relationship between a vehicle and the stereo optical module 1 and calculates system calibration data 68.

Moreover, although the correction information stored in the correction information memory 7 is calibration data used for shading correction processing or rectification processing, information of a clipped region of an image or calibration data of a positional relationship of a vehicle may be of course added. Additionally, the correction information memory 7 may be arranged on the central control unit 3 side. Further, it is possible to adopt a configuration which appropriately enables reading and writing through the communication line 2.

Second Embodiment

A second embodiment of the stereo camera system according to the present invention will now be described. It is to be noted that like reference numerals denote the same structures as those in the first embodiment, thereby eliminating their explanation.

Figure 10:
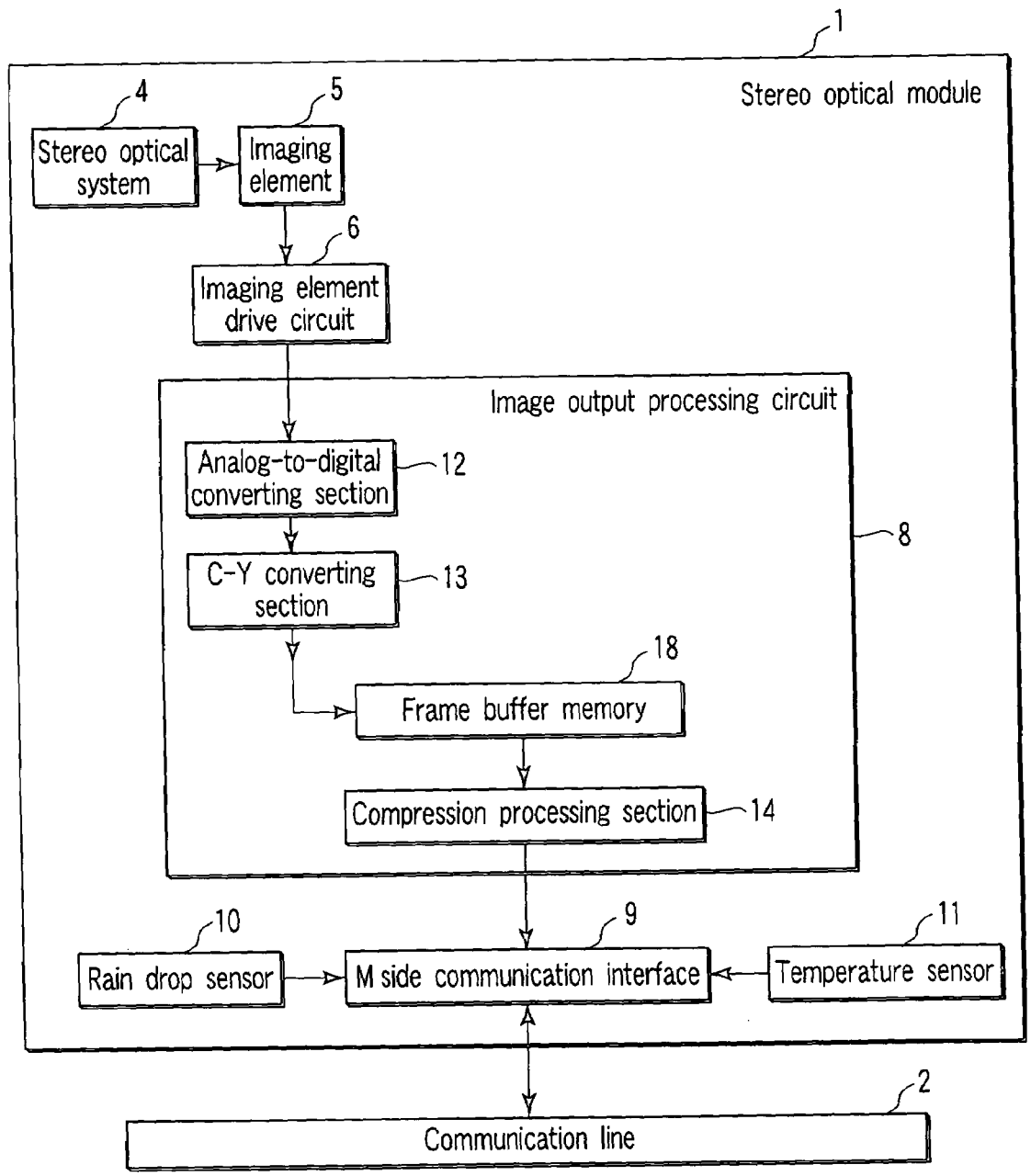
FIG. 10 is a block diagram showing a circuit configuration of a stereo optical module in a second embodiment of the present invention.
Figure 11:
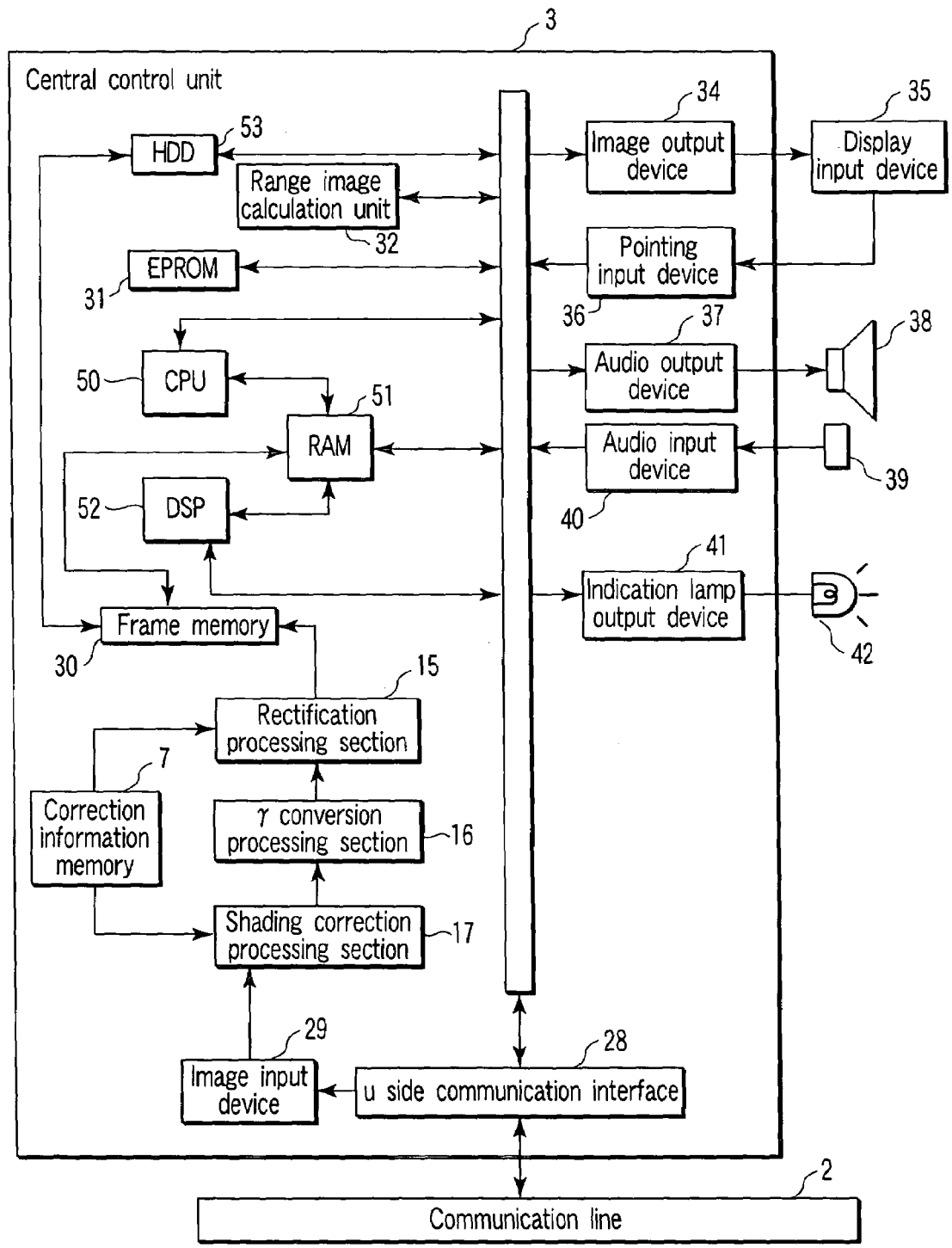
FIG. 11 is a block diagram showing a circuit configuration of a central control unit according to the second embodiment of the present invention.

That is, in this second embodiment, as shown in FIG. 10, processing circuits such as a rectification processing section 15, a γ conversion processing section 16, a shading correction processing section 17 and others and a correction information memory 7 are not mounted in a stereo optical module 1, but they are mounted in a central control unit 3 as shown in FIG. 11.

As a result, a circuit scale of each electronic circuit in the stereo optical module can be reduced. That is, suppressing heat generated in the stereo optical module can restrain fluctuations in calibration data due to thermal deformation of an optical system or the like in the stereo optical module. Furthermore, since an imaging element 5 can be effectively cooled due to a reduction in other heat generating elements, generation of thermal noise can be suppressed, thereby outputting a better stereo image to a communication line 2.

It is to be noted that each structure in this second embodiment can be of course modified and changed in many ways like the first embodiment.

Third Embodiment

A third embodiment of the stereo camera system according to the present invention will now be described. It is to be noted that like reference numerals denote the same structures as those in the first and second embodiments, thereby eliminating their explanation. That is, as shown in FIG. 12, a central control unit in the third embodiment is obtained by eliminating the range image calculation unit from the central control unit according to the first embodiment shown in FIG. 6.

Figure 12:
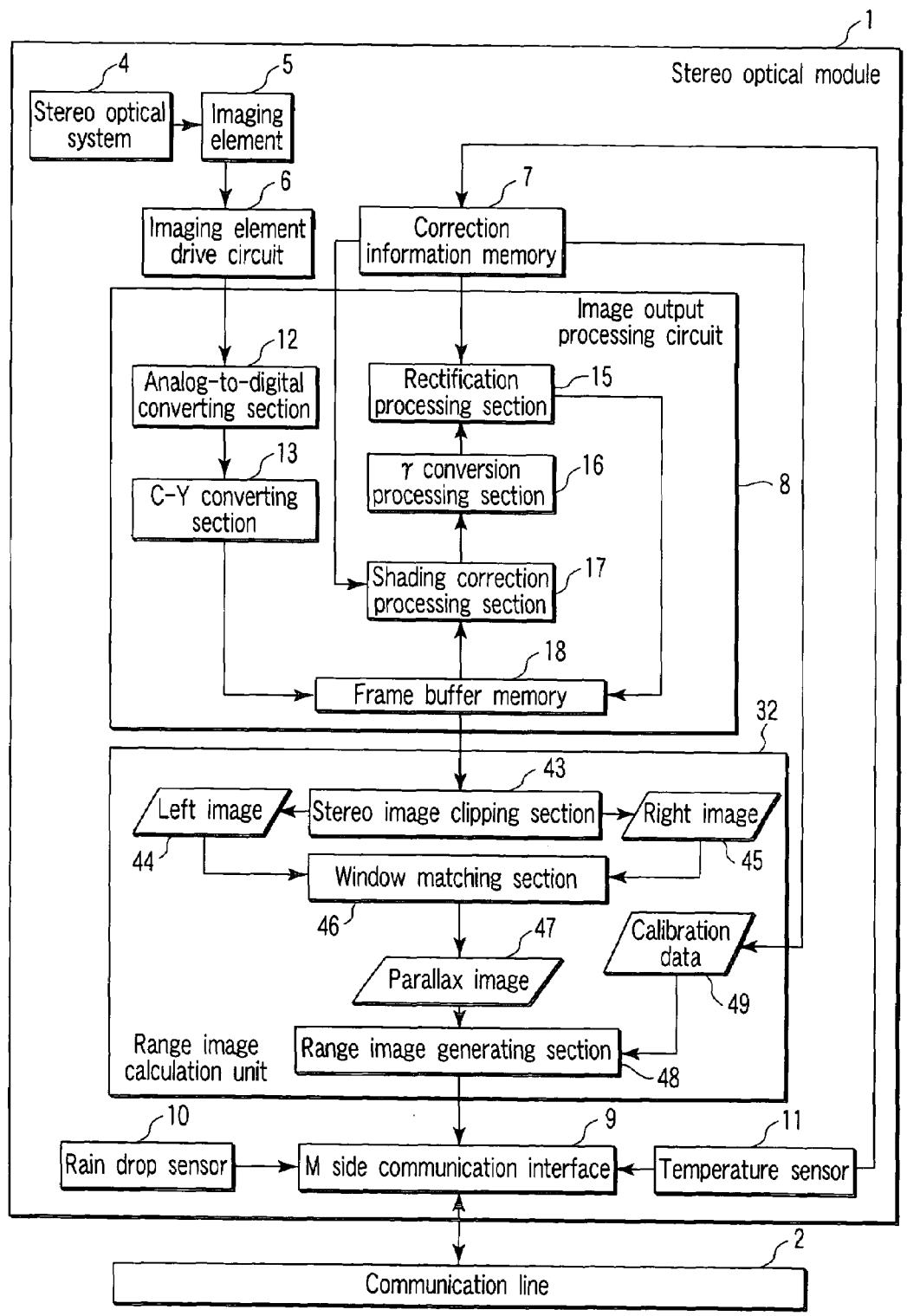
FIG. 12 is a block diagram showing a circuit configuration of a stereo optical module in a third embodiment of the present invention.

That is, in this third embodiment, as shown in FIG. 12, processing from the beginning to stereo matching processing is carried out in the stereo optical module. Therefore, a range image calculation unit 32 is also included in a stereo optical module 1. In this case, a two-dimensional image and a range image used for object recognition are output to a communication line 2. A difference of the third embodiment from the first embodiment lies in that image data is transmitted from an M side communication interface 9 in the stereo optical module in an analog scheme based on NTSC.

Figure 13:
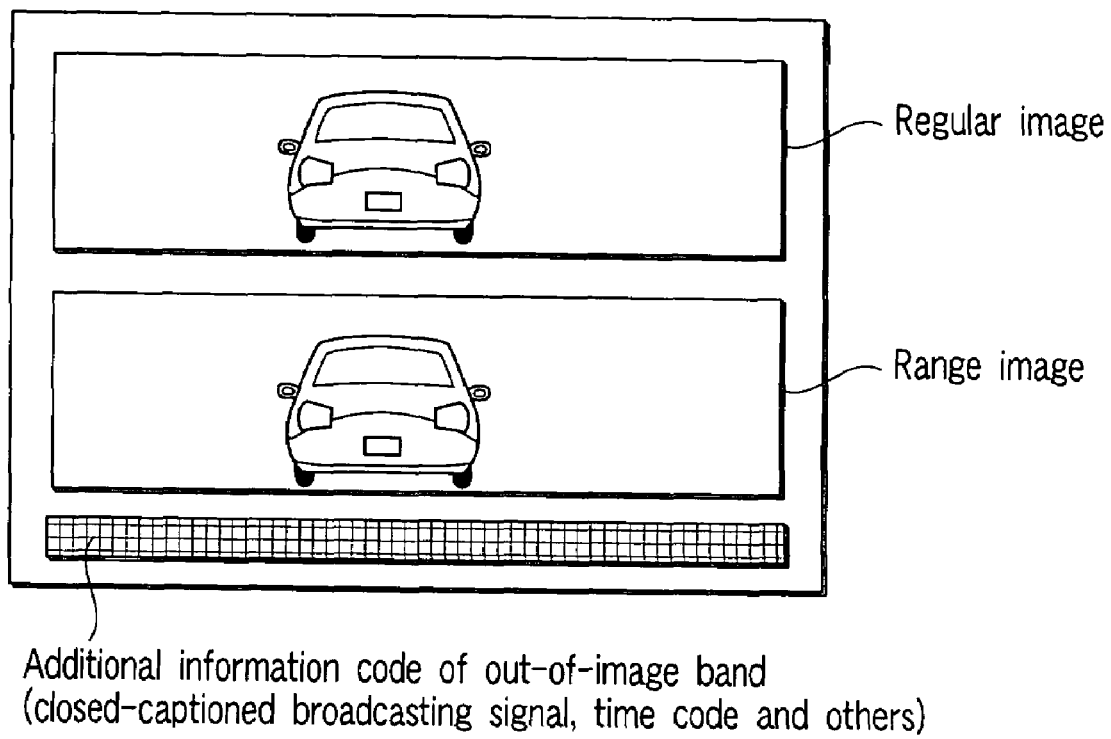
FIG. 13 is a view showing a communication content example using a video format such as a DV format or an NTSC standard.

The two-dimensional image and the range image are aligned and rearranged in, e.g., one NTSC type screen as shown in FIG. 13, and output as video signals. As a result, the range image and the two-dimensional image can be transmitted to a central control unit 3 in a synchronized state. Further, when information indicating that which one of right and left images is used and output as a reference image, a temperature detected by a temperature sensor 11 or information detected by a rain drop sensor 10 is encoded in, e.g., a signal region used in text broadcasting and transmitted, communication synchronized with the images can be performed.

After communication is carried out in this manner, the central control unit 3 decodes the transmitted images by using a u side communication interface 28 so that these images are processed as the two-dimensional image, the range image and the sensor information, thereby realizing various kinds of recognition processing. Specifically, the central control unit 3 evaluates a non-illustrated object in a surrounding judgment unit 33 as range image evaluation device based on range image data input through the u side communication interface 28.

It is to be noted that the plurality of stereo optical modules can be used and, for example, when two stereo optical modules are used, a code indicative of a camera ID of each stereo module and a range image may be added in each of upper and lower images in the screen, and these images may be synchronized with a single video to be transmitted to the central control unit 3.

Furthermore, in the central control unit 3, various processing circuits may be realized by hardware wire connection of dedicated ASICs, and they may be constituted of reconfigurable processors which can be dynamically rewritten.

Moreover, although the two-dimensional image and the range image used for object recognition are output by using the NTSC type analog signal line in the third embodiment, they may be output to a digital communication line as digital data like the first embodiment. In this case, data compression processing may be performed with respect to these images by using a data compression scheme such as motion-JPEG or MPEG and then the processed image may be output to the communication line 2 like the first embodiment.

When mounted in a vehicle in particular, as shown in FIG. 7, the stereo optical module 1, the central control unit 3, an operating status detection module and others may be connected with the communication line 2 so that various kinds of in-vehicle modules can work with each other. Here, as the operating status detection module, there are, e.g., a vehicle speed sensor module 55, an engine control module 57, a brake sensor module 61 and others such as shown in FIG. 7. Further, as a surrounding monitoring module, there are a radar module 54, a car navigation module 56, a side camera module 56, an interior monitoring module 59, a rear camera module 62, a load detection module 63, a rear ultrasonic radar module 64 and others as shown in FIG. 7. For communication between units or modules used as a part of such a vehicle network, it is possible to use Bluetooth, IEEE 802.11, IEEE 802.1x or the like as a wireless communication technology. Furthermore, a wired network such as USB, IEEE 1394 or Ethernet, a transmission protocol of sound data such as voice over IP (VoIP), a real time messaging function (RTC/SIP client) and others can be used, and an in-car LAN in which an IP address is allocated to each device by IPv6 or the like may be constituted. Moreover, it is also possible to use a communication bus line corresponding to open standard specifications such as an in-vehicle optical network standard "MOST" or "CAN" which is strong with respect to in-car noise or the like.

Additionally, the communication line 2, the stereo optical module 1 and the central control unit 3 may be electrically insulated from each other through a photocoupler so that circuits are not affected by various kinds of spike noise or the like applied to a harness.

Further, for input or display, it is possible to use GUI or an sound interface configured by a user interface design tool for in-vehicle devices such as Automotive UI Toolkit produced by Microsoft (registered trademark) Corporation, for example.

That is, in the third embodiment, not only image processing required for the stereo optical module, e.g., rectification, γ correction, shading correction or separation into a luminance signal and a chrominance signal with respect to stereo image data obtained in the stereo optical module is carried out but also calculation of a range image is performed in the stereo optical module. Therefore, as compared with the first embodiment, a circuit load can be reduced on the central control unit side, and specifications can be further simplified on the central control unit side, thereby improving general versatility of the central control unit.

Fourth Embodiment

A fourth embodiment according to the present invention will now be described. In this fourth embodiment, a description will be given on an operation sequence of a stereo camera system which is carried out in order to perform better range image calculation. It is to be noted that a trigger signal for the purpose of an in-vehicle application will be taken as an example here. Incidentally, the fourth embodiment shows an operation sequence of the stereo camera system according to the first embodiment. It is needless to say that this sequence can be likewise applied to the configurations according to the second or third embodiment.

A main operation sequence in the stereo camera system will be first described with reference to FIG. 14. That is, when an opened state of a door key or switching to an ON state of an ignition key by an operator such as a driver is detected, the central control unit 3 in a sleep state resumes (step S1), and is activated (step S2). The central control unit 3 starts up the image output processing circuit 8 and the imaging element 5 of the stereo optical module 1 simultaneously with activation (steps S3 and S4). Here, an "activation command" required to activate the stereo optical module 1 is transmitted to the stereo optical module 1 from the central control unit 3 through the communication line 2. The stereo optical module 1 switches a non-illustrated internal power supply circuit from an energy saving mode to an operating mode in response to this "activation command", and then starts up the image output processing circuit 8 and the imaging element 5. As a result, imaging begins. Furthermore, at the same time, the central control unit 3 starts a sensor check sequence shown in FIG. 15 (step S5). Particulars of this sensor check sequence will be described later.

When environmental information data 100 having no problem is output to the rectification processing section 15 as a result of the sensor check sequence, rectification processing begins. That is, the rectification processing section 15 perform rectification processing based on this environmental information data 100 or the calibration data 101 or the like stored in the correction information memory 7 (step S7). Further, a rectification image subjected to this rectification processing is supplied to the central control unit 3 through the communication line 2. It is to be noted that, in the central control unit 3, for example, the surrounding judgment unit 33 checks whether the calibration data 101 used for this rectification processing and stored in the frame memory 30 is adequate based on the rectification image (step S8), and deletes this rectification image from the frame memory 30 in order to prevent this image from being used if this calibration data 101 has a problem. Furthermore, later-described calibration data correction processing is carried out (step S9), and the calibration data corrected by this correction processing is overwritten in the correction information memory 7 in the stereo optical module 1 through the communication line 2, thereby updating the stored calibration data 101 (step S10). Moreover, in the rectification processing at step S7, this updated calibration data 101 is used to execute the rectification processing. As a result, the rectification processing is always executed with the latest and correct calibration data.

If it is determined that the calibration data has no problem based on the rectification image subjected to the rectification processing, the range image calculation unit 32 in the central control unit 3 performs window matching processing based on the input rectification image (step S12), generates a range image, and outputs the generated range image to the surrounding judgment unit 33 (step S13). The surrounding judgment unit 33 in the central control unit 3 carries out later-described driving assistance by using this range image (step S14).

Here, when the door key is opened or the ignition key is switched to an OFF state, a judgment at step S15 jumps to "yes" to record the current calibration data (step S16), the central control unit 3 enters the sleep state, and the stereo optical module 1 also stops its operation. Here, an "operation stop command" used to stop the operation of the stereo optical module 1 is transmitted to the stereo optical module 1 from the central control unit 3 through the communication line 2. The stereo optical module 1 performs a predetermined operation in response to this "operation stop command" and then enters the energy saving mode.

The sensor check sequence at step S5 in FIG. 14 will now be described with reference to FIG. 15. Here, it is to be noted that a description will be given on the assumption that the stereo optical module 1 is attached to a rearview mirror in a car and a front side of a vehicle body is imaged through a front window glass.

In this sensor check, the central control unit 3 first detects dull deposits/dew drops on the front window glass by a know technique (step S21), and judges whether there are dull deposits or dew drops on the front window glass of the vehicle (step S22). If it is determined that there are dull deposits in this judgment, the central control unit 3 turns on a non-illustrated defroster to remove the dull deposits (step S23), and performs dull deposit warning display in the display input device 35 (step S24). Moreover, when the dull deposits are removed by an effect of the defroster, the central control unit 3 determines that there is no dull deposit in the judgment at step S22, and turns off the dull deposit warning display (step S25).

Then, the central control unit 3 detects rain drops by using an output transmitted from the rain drop sensor 10 through the communication line 2 (step S26), and judges whether there are rain drops on the front window glass (step S27). If it is determined that there are rain drops in this judgment, the central control unit 3 operates a non-illustrated wiper to start removal of the rain drops (step S28), and performs rain warning display in the display input device 35 (step S29). Additionally, when the rain drops are removed by an effect of the wiper, the central control unit 3 determines that there is no rain drop in the judgment at step S27, and turns off the rain warning display (step S30).

Then, the central control unit 3 detects an ambient temperature of the stereo optical module 1 by using the temperature sensor 11 (step S31), and judges whether a detected temperature falls within a range appropriate for the operation of the stereo optical module 1 (step S32). If it is determined that the detected temperature doesn't fall within the appropriate range in this judgment, the central control unit 3 operates a non-illustrated air conditioner to adjust a temperature (step S33), and performs temperature warning display in the display input device 35 (step S34). Additionally, when the temperature falls within the appropriate temperature range by an effect of the air conditioner, the central control unit 3 determines that the temperature falls within the appropriate temperature range in the judgment at the step 32, and turns off the temperature warning display (step S35).

These sensor checks are executed while the central control unit 3 is operating. That is, the central control unit 3 judges whether a stop signal is input (step S36), and terminates these sensor checks when it is determined that the stop signal is input. On the other hand, when it is determined that the stop signal is not input, it outputs the environmental information data 100 such as dull deposit information, rain drop sensor information and temperature sensor information to the rectification processing section 15 in the stereo optical module 1 through the communication line 2 (step S37), and the routine returns to step S21 to continue the sensor checks.

It is to be noted that, as apparent from the flowchart of the sensor check, the environmental information data 100 is output only when dull deposits, dew drops, rain drops and a temperature fall within predetermined condition ranges, and hence the rectification processing using this environmental information data 100 is not started even if a stereo image is captured by the imaging element 5. Therefore, in such a case, it is preferable to use the display input device 35 to perform warning display informing a driver that an operation is not carried out because predetermined conditions are not obtained rather than that an operation is not performed because of a failure.

Figure 14:
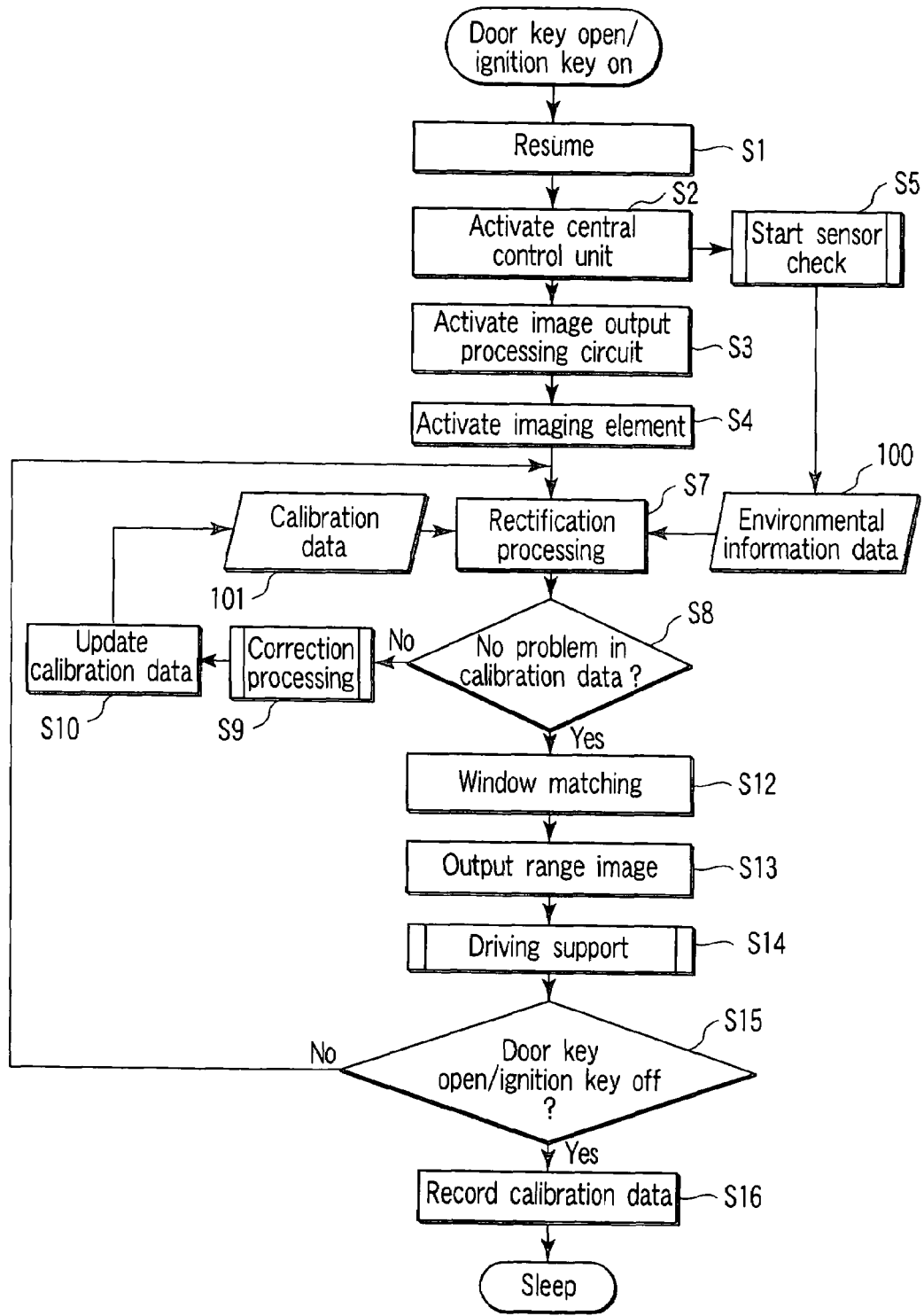
FIG. 14 is a flowchart of a main operation sequence of a stereo camera in a fourth embodiment of the present invention.
Figure 16:
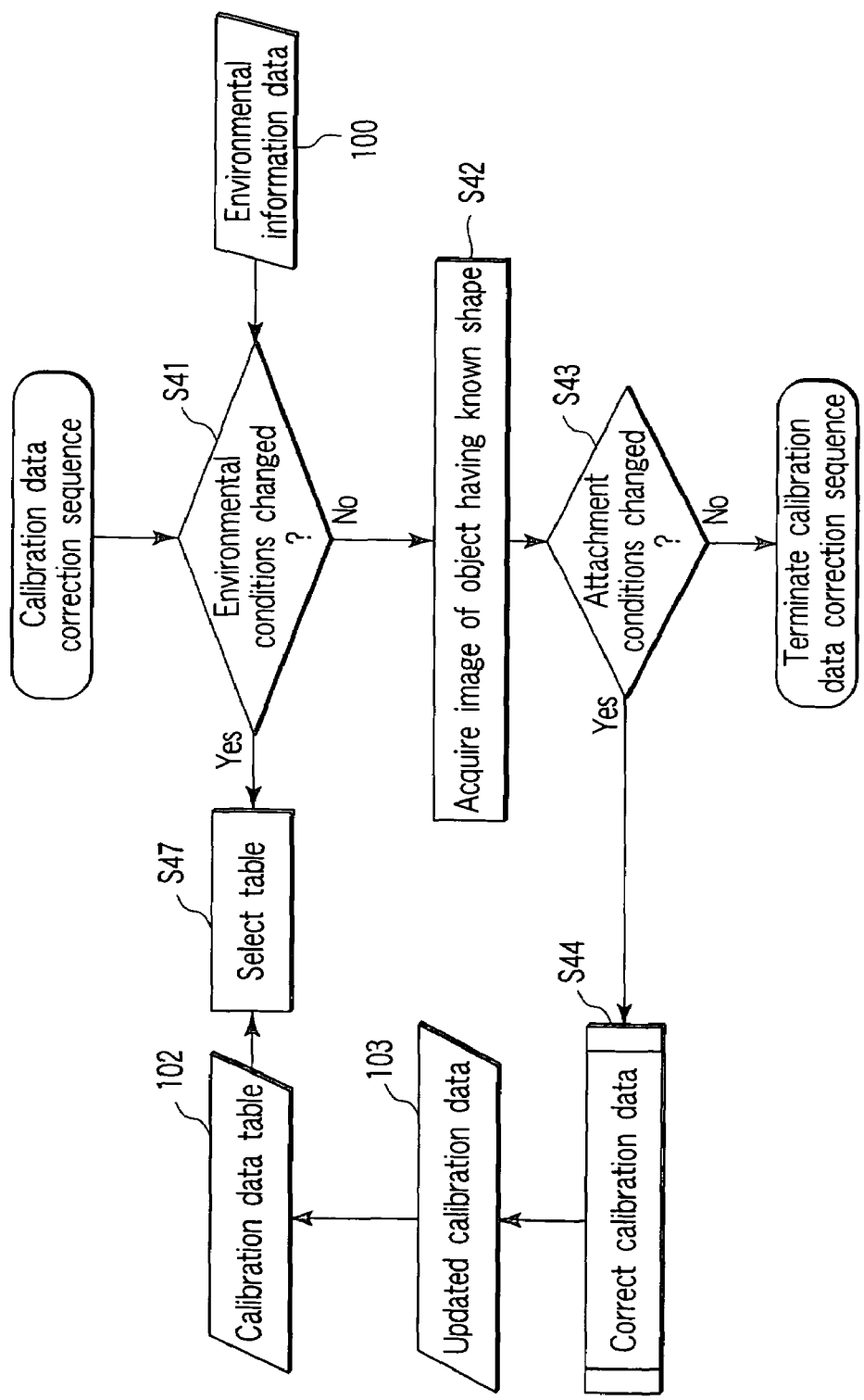
FIG. 16 is a flowchart of a calibration data correction sequence.

FIG. 16 is a flowchart showing the calibration data correction sequence at step S9 in FIG. 14.

That is, as shown in FIG. 16, the surrounding judgment unit 33 first judges whether environmental conditions such as temperature information detected by the temperature sensor 11 and obtained through the communication line 2 have changed (step S41) and, for example, when the calibration data varies due to thermal expansion caused by a change in temperature, calibration data 101 corresponding to this temperature is read from a calibration data table 102 according to temperature brackets previously prepared in the EPROM 31 or the HDD 53, and the read data is written in the correction information memory 7 of the stereo optical module 1 through the communication line 2 (step S47), thereby updating the calibration data 101.

Alternatively, if it is determined that there is no change in environmental conditions at step S41, an image of an object having a known shape (in this example, a stereo image supplied from the stereo optical module 1 through the communication line 2) is acquired (step S42), a judgment is made upon whether attachment conditions such as an attachment position of the stereo optical module 1 have varied (step S43) and, when the attachment conditions have changed, the calibration data is corrected in accordance with this change (step S44), and corrected and updated calibration data 103 is added in the calibration data table 102 and also written in the correction information memory 7 of the stereo optical module 1 through the communication line 2, thereby updating the calibration data 101 used in the rectification processing.

Performing such correction can always execute the rectification processing or window matching in an excellent state.

Figure 17:
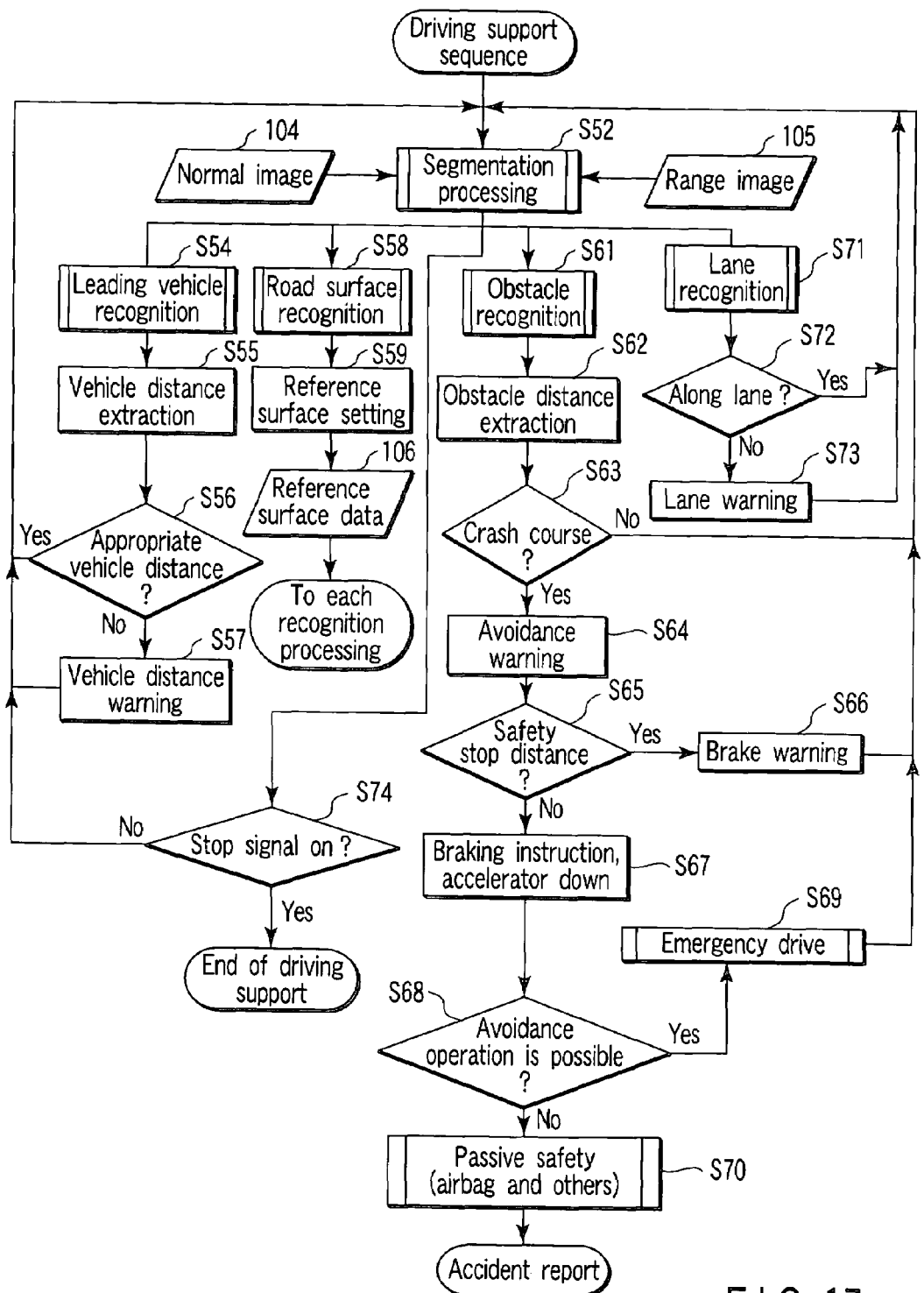
FIG. 17 is a flowchart of a driving support sequence.

FIG. 17 is a flowchart showing an example of the driving support sequence at step S14 in FIG. 14.

That is, when the surrounding judgment unit 33 enters this driving support sequence, it uses a normal image (one image clipped by the stereo image clipping section 43) 104 and a range image 105 as inputs to carry out segmentation processing based on a range distribution (step S52), and then executes leading vehicle recognition (steps S54 to S57), road surface recognition (steps S58 to S59), obstacle recognition (steps S61 to S70), lane recognition (steps S71 to S73) and others.

Figure 18:
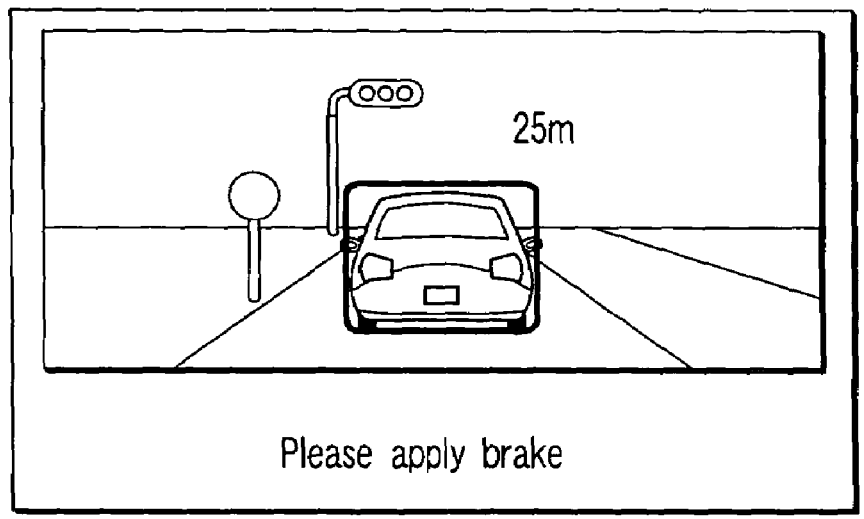
FIG. 18 is a view showing a display example of an inter-vehicle distance warning.

In the leading vehicle recognition, a leading vehicle recognized by detecting a laser beam reflected from a vehicle by the radar module 54 using a laser radar or the like is extracted from the normal image 104, and matched with segmentation of the range image 105 to recognize a region of the leading vehicle (step S54), and the recognized region is extracted together with information such as a vehicle width of the leading vehicle or the like, thereby extracting a distance from the leading vehicle (step S55). Then, the distance from the leading vehicle is checked (step S56), and image display such as shown in FIG. 18 is performed in the display input device 35 through the image output device 34 when the distance from the leading vehicle is not appropriate (for example, too short), thereby carrying out inter-vehicle distance warning (step S57).

Figure 19:
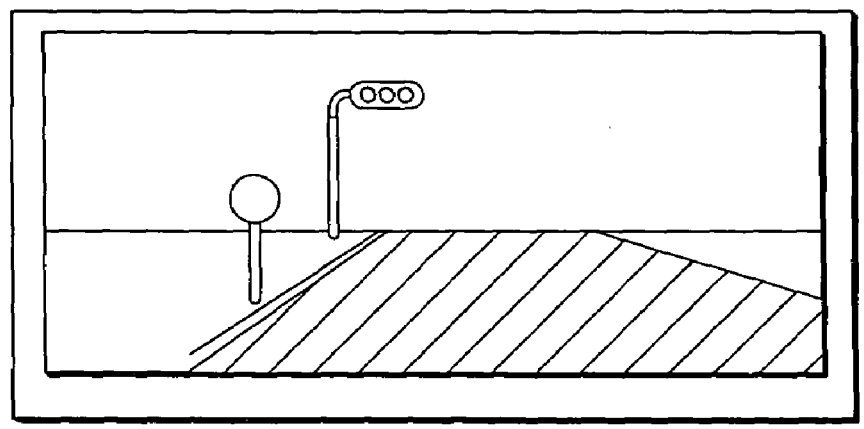
FIG. 19 is a display example of a road surface recognition result.
Figure 20:
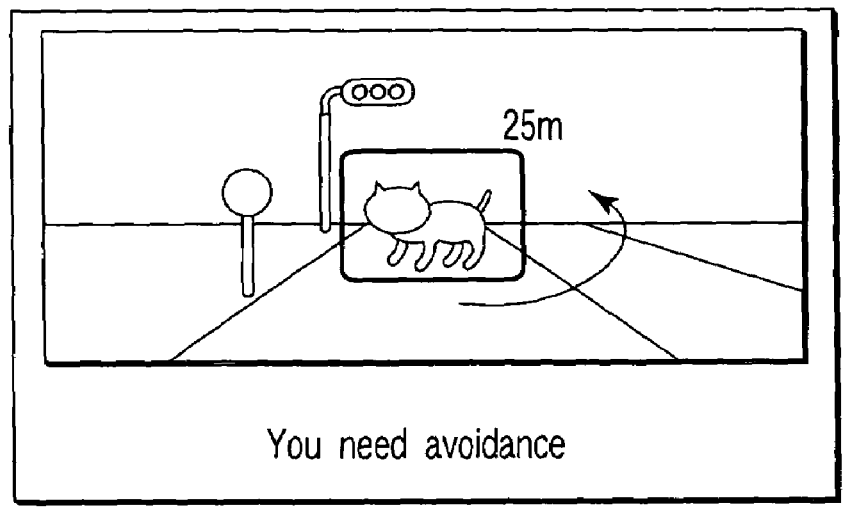
FIG. 20 is a display example of an avoidance warning.

In the road surface detection, in the range image 105, a plane which can be recognized from the range image 105 is discovered at a position which is assured to have a road surface (step S58), and a range of this plane is recognized as a plane having the same plane as the road surface. Further, this road plane is set as a reference surface (step S59). When data 106 of this reference surface is used in each recognition processing, it can be utilized for recognition of an object, recognition of a leading vehicle, recognition of a lane or the like. At this time, as shown in FIG. 19, the recognized plane may be displayed in the display input device 35 through the image output device 34.

In the obstacle recognition, for example, an object which rises from the plane detected by the road surface detection and recognized by the segmentation processing of the range image 105 is recognized (step S61), and its distance, size and others are labeled as an obstacle. In accordance with this, a distance of the obstacle is extracted (step S62), a judgment is made upon whether the current course is a crash course (step S63), and performs an avoidance warning to urge an operator to avoid in the display input device 35 through the image output device 34 in case of the crash course (step S64). Then, a judgment is made upon whether the distance extracted at step S62 is a distance with which a car can stop by a spontaneous braking operation by an operator, i.e., a driver (step S65), and performs a warning in the display input device 35 through the image output device 34 to urge the operator to apply the brake if the car can safely stop (step S66). On the other hand, in case of the distance with which the car cannot safely stop, the operator is instructed to apply the brake from the display input device 35 through the image output device 34, and an accelerator pedal is automatically released (step S67). Further, here, if an avoidance operation is possible (step S68), a measure for safety, e.g., urging steering in the display input device 35 through the image output device 34 as emerging driving is taken (step S69).

If crash is unavoidable, prearrangement for passive safety, e.g., air-bags, is performed (step S70). In particular, when a communication system outside the car can operate, accident report such as a present location, report of occurrence of an accident or the like may be configured to be automatically carried out.

Figure 21:
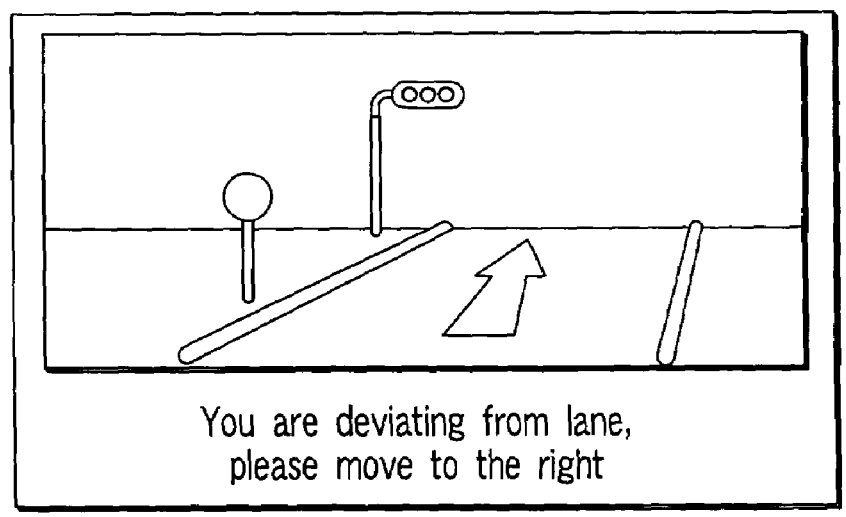
FIG. 21 is a display example of a lane recognition result.
Figure 22:
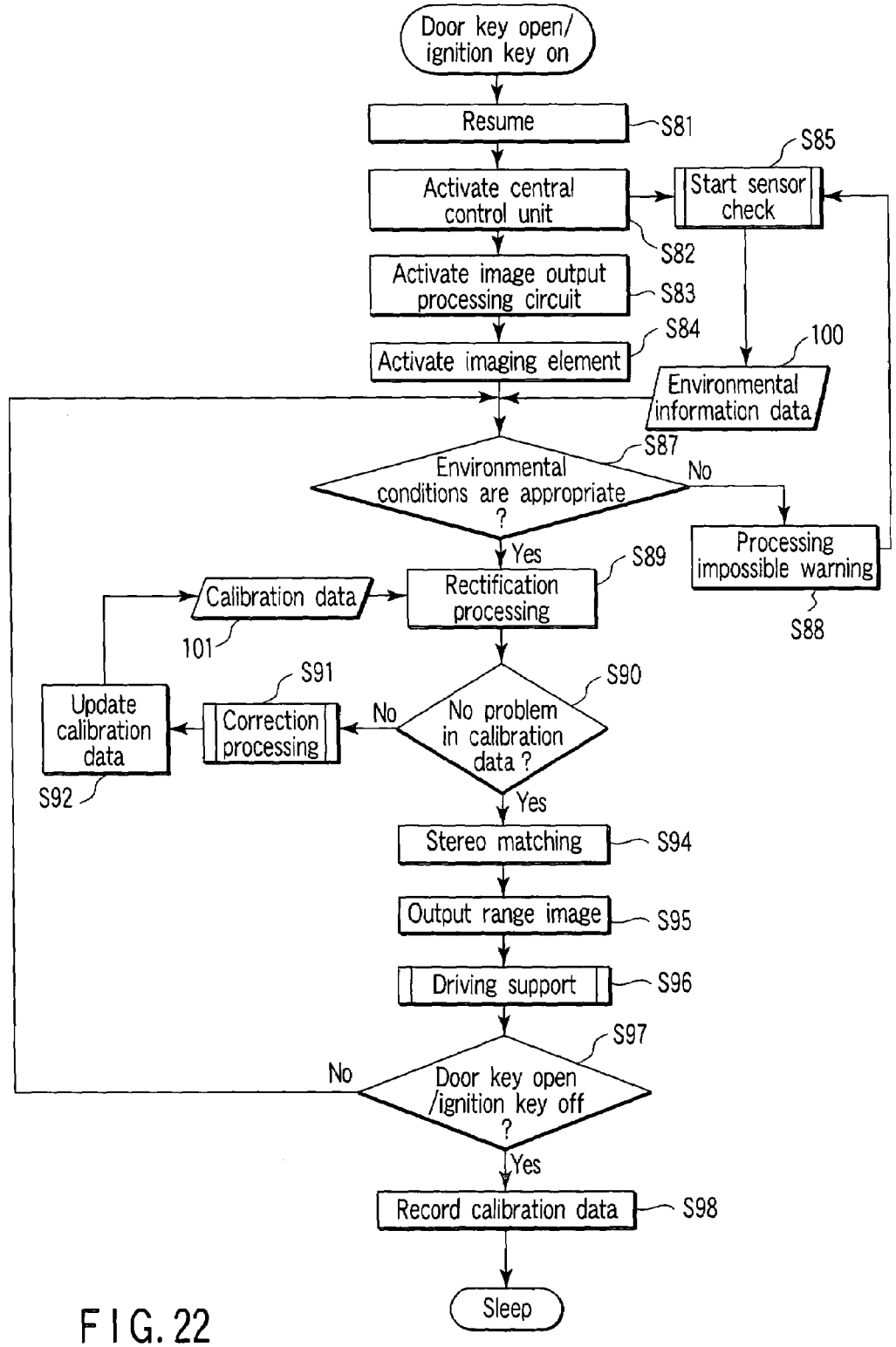
FIG. 22 is a flowchart showing a modification of the flowchart of the main operation sequence.

In the lane recognition, a white line existing on the reference plane is recognized from a luminance value of the normal image 104, or a guard rail protruding at a fixed height from the reference plane is recognized from the range image 105, thereby recognizing a lane (step S71). As a result, a travelable region is recognized, whether a car is traveling within a lane is checked (step S72), and display of a lane warning or the like is performed in the display input device 35 through the image output device 34 as shown in FIG. 21 when the car is going to deviate from the lane (step S73).

It is to be noted that the description has been given as to the example where the warning is displayed in a screen of the display input device 35 connected with the central control unit 3 shown in FIG. 6 as the warning in the fourth embodiment, but it is possible to give a sound warning from the speaker 38, turn on the indication lamp 42, or give a warning using means, e.g., vibrating a driver's seat to draw the operator's attention as natural modifications although not shown. This is effective when immediacy is high like the steps S64, S66 and S67 and averting the operator's eyes from the front side is not preferable in particular.

As described above, according to the fourth embodiment, it is possible to carry out stereo matching while appropriately selecting and correcting the calibration data in accordance with the environmental information.

It is to be noted that each structure in this fourth embodiment can be of course modified and changed in many ways.

For example, the calibration data may be corrected by selecting from a plurality of calibration data tables subjected to table conversion based on a temperature or the like in advance.

Furthermore, a countermeasure when a sensor has discovered a problem in the sensor check is not restricted to the defroster, the wiper and the air conditioner described in the fourth embodiment, and it is possible to adopt any other means, e.g., using a dull deposit inhibiting coating or a hot-wire heater in place of the defroster, using a super-water-shedding glass coat or a blower in place of the wiper, or using a peltiert device or an air-cooling fan in place of the air conditioner.

Moreover, the flowchart of the operation sequence shown in FIG. 14 can be also changed in many ways. For example, the environmental information data 100 may be output when dull deposits/dew drops/rain drops/a temperature do not fall within a predetermined condition range in the sensor check, and the sensor check sequence may be activated to stop the range image output processing and a processing impossible warning may be displayed in the display input device 35 through the image output device 34 (step S88) when conditions of the environmental information in the environmental information data 100 are inappropriate (step S87: no) and the rectification processing or the like cannot be performed, thereby informing an operator such as a driver of this fact.

Figure 15:
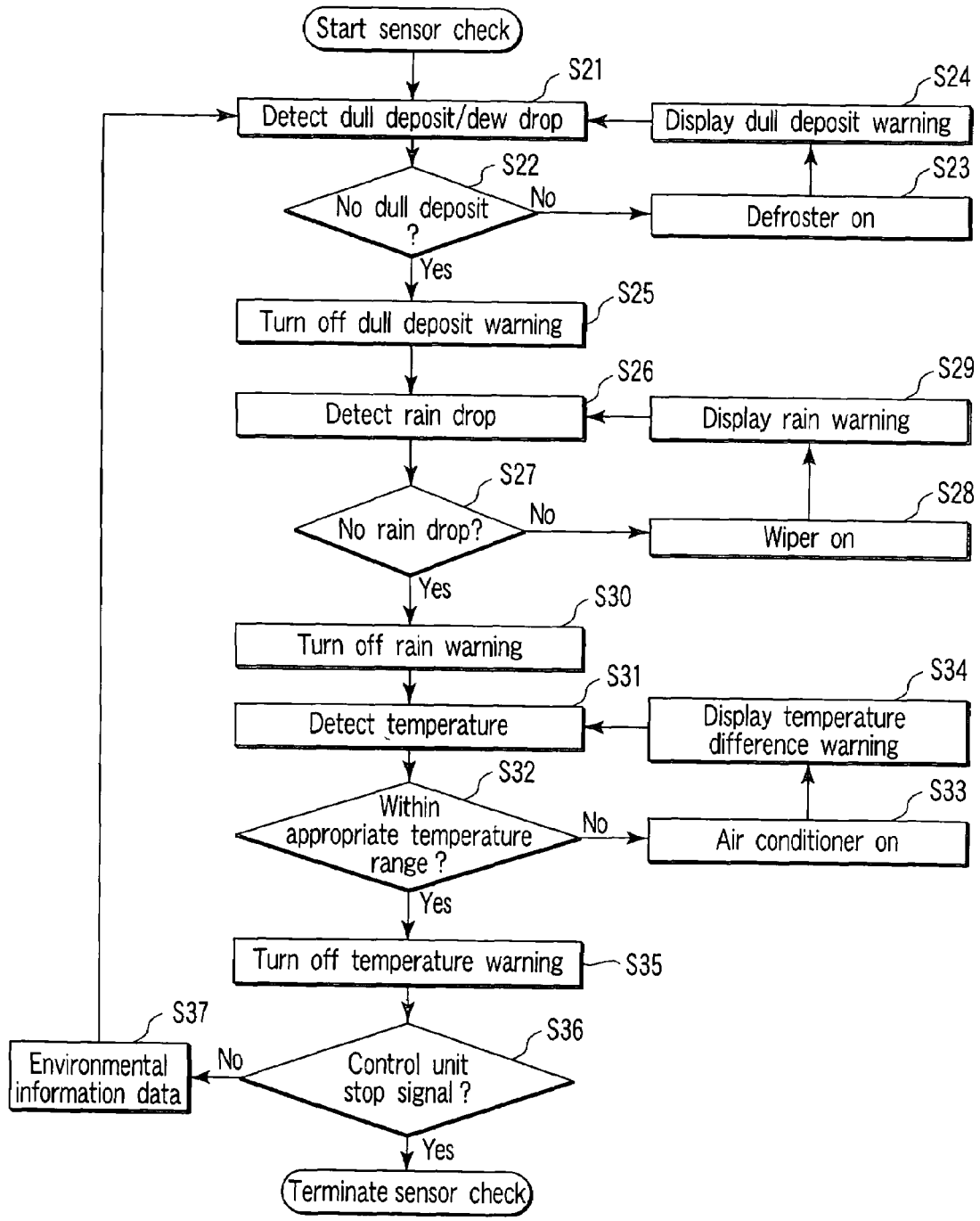
FIG. 15 is a flowchart showing a sensor check sequence.
Figure 23:
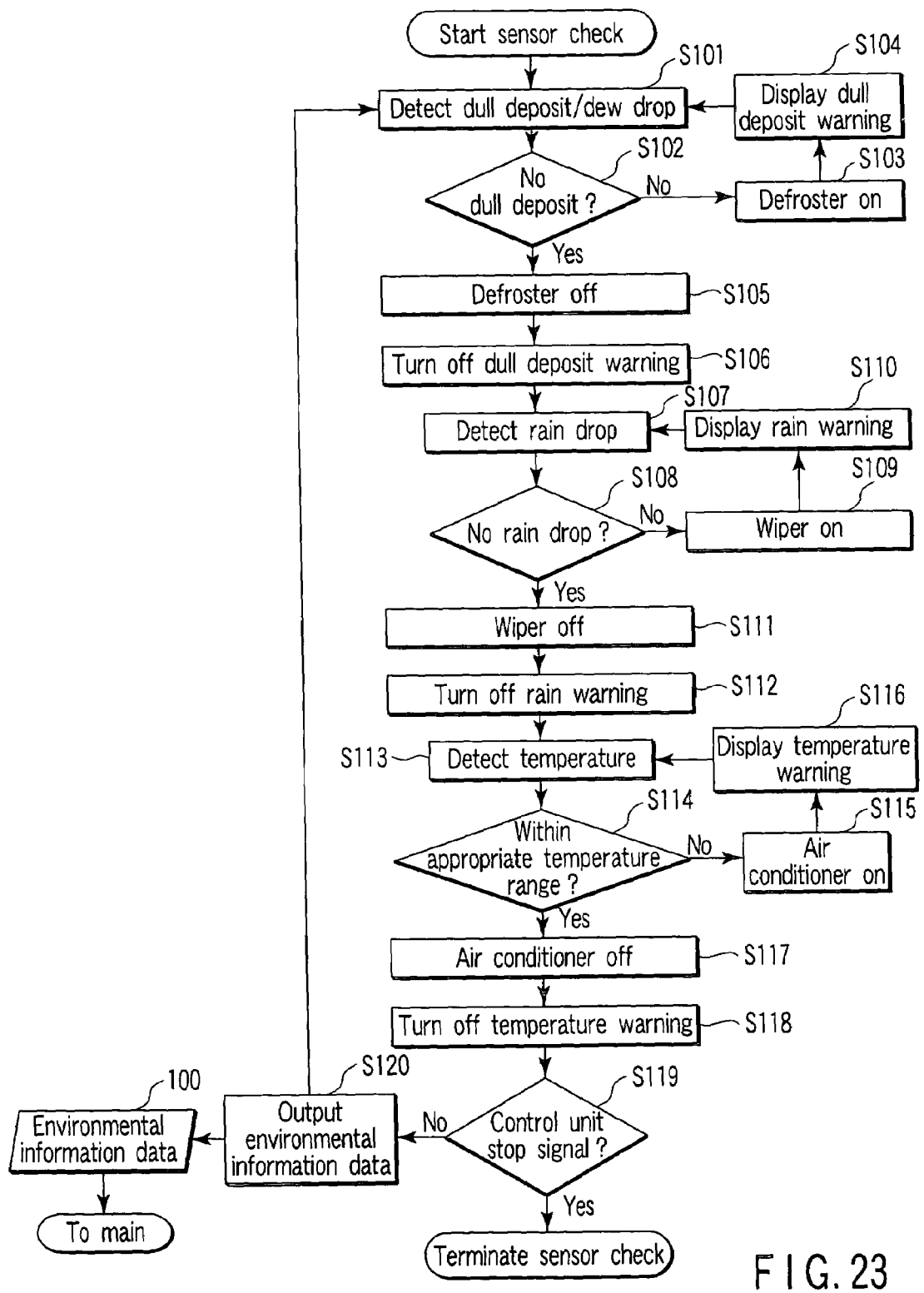
FIG. 23 is a flowchart showing a first modification of the sensor check sequence.

Additionally, although the dull deposit remover or the wiper is continuously used in the sensor check sequence shown in FIG. 15, the defroster, the wiper or the air conditioner may be turned off when the sensor information indicates an excellent state as shown in FIG. 23 (steps S105, S111 and S117). Further, data of environmental information (temperature sensor information or the like) may be periodically output (step S120).

Figure 24:
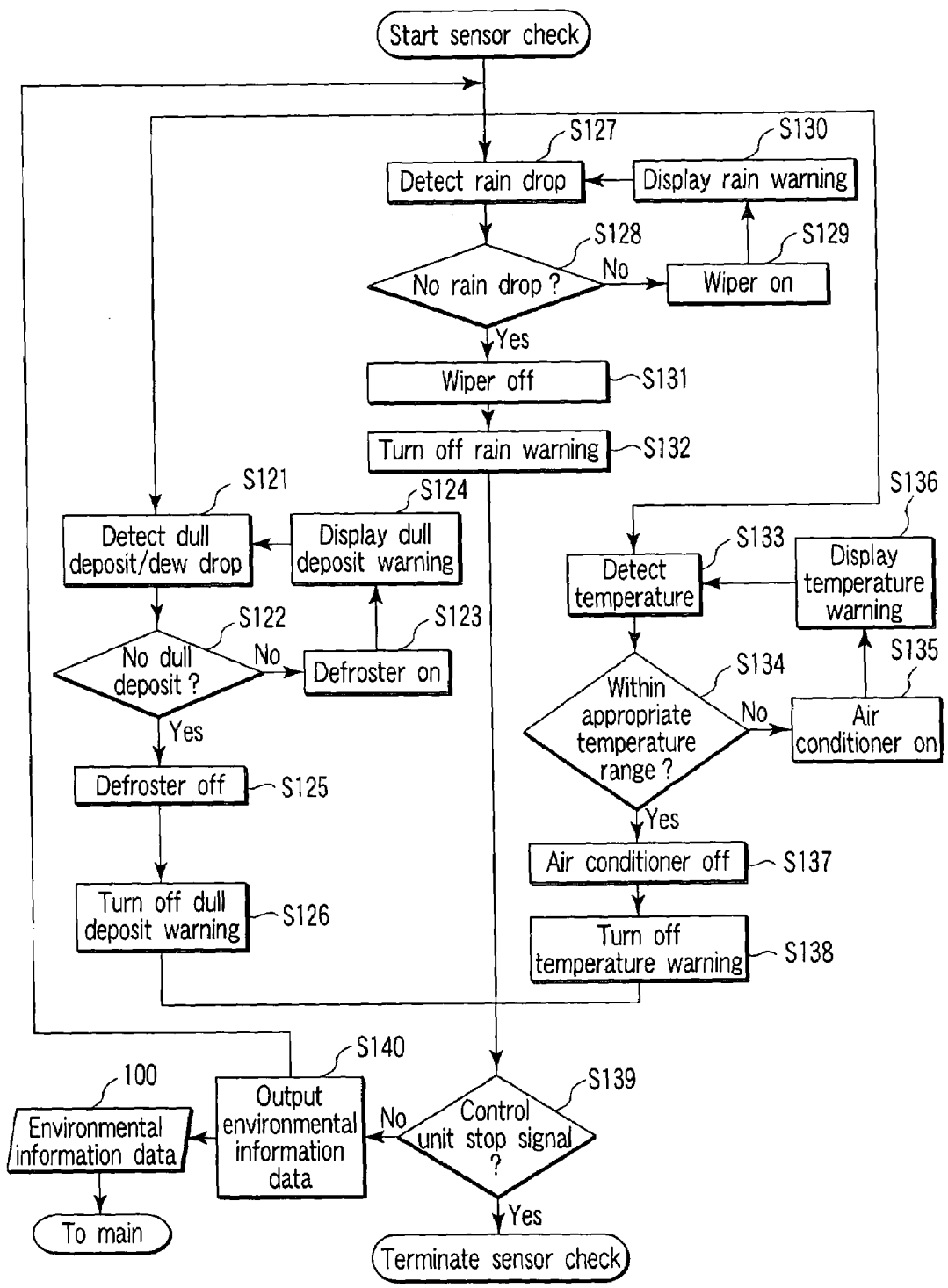
FIG. 24 is a flowchart showing a second modification of the sensor check sequence.

Furthermore, the description has been given as to the example where all processing is executed in series in the sensor check sequence shown in FIG. 15, respective environmental conditions may be simultaneously checked (steps S122, S128 and S134), or an operation for eliminating a measurement disabled state (steps S123, S129 and S135) may be carried out as shown in FIG. 24. Moreover, the operation for eliminating the measurement disabled state may be automatically executed by the system, and a message indicating that processing is impossible may be displayed to the operator.

Additionally, although dull deposits, rain drops and a temperature are presented as typical environmental conditions in the fourth embodiment, it is possible to use, as environmental information, fog, a problem in the imaging element, switching between a day and a night, illuminance information, dead leaves or bird droppings, contamination or blocking of the window glass by, e.g., a mascot hung in a car, or information such as a relative position of an oncoming vehicle.

Further, the fourth embodiment can be also used in a stereo camera utilizing a plurality of imaging elements.

Fifth Embodiment

A fifth embodiment according to the present invention will now be described. This fifth embodiment will be explained in relation to a system having a plurality of optical modules. A configuration of each optical module is based on the first to fourth embodiments.

Figure 25:
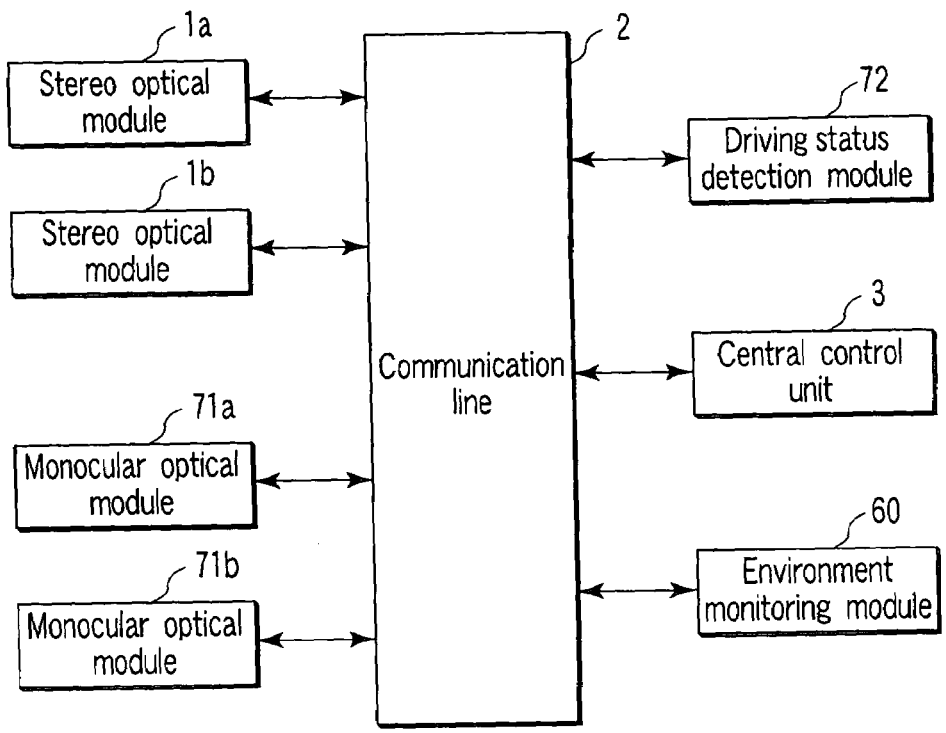
FIG. 25 is a block diagram showing a configuration of a stereo camera system in a fifth embodiment of the present invention.

That is, a plurality of stereo optical modules 1a and 1b and monocular optical modules 71a and 71b are connected with a communication line 2 as shown in FIG. 25. To the communication line 2 are connected a central control unit 3, an operating status detection module 72, an environment monitoring module 60 and others.

Here, as the monocular optical module, there is the side camera module 58 or the rear camera module 62 shown in FIG. 7. Furthermore, as the operating status detection module 72, there is the engine control module 57 or the brake sensor module 61 shown in FIG. 7, or a steering angle detection module, a transmission monitoring module or the like which is not shown. Moreover, as the environment monitoring module 60, there is the radar module 54, the vehicle speed sensor module 55, the car navigation module 56, the interior monitoring module 59, the load detection module 63, the rear ultrasonic radar module 64 or the like shown in FIG. 7.

Here, when information such as a camera ID of each optical module or calibration data in each optical module is added to image information obtained in each optical module and the obtained information is transmitted/received and judged by the central control unit 3, it is possible to determine which calibration data should be used to process the information of each optical module.

Further, the communication line 2 is a one-system communication line, and communication can be efficiently performed between the respective units including the central control unit 3 and the stereo optical module 1a by using this communication line 2. That is, in this communication, the central control unit 3 collectively performs sequence control over the entire system, and the central control unit 3 transmits various kinds of control commands including a data request command to each unit, whilst each unit returns requested data or the like to the central control unit 3.

Furthermore, as shown in FIG. 25, in-car harnesses can be reduced by sharing the communication line 2. Therefore, it is possible to obtain effects such as a reduction in weight, a decrease in influence of noise interference.

Sixth Embodiment

A sixth embodiment according to the present invention will now be described. This sixth embodiment is an embodiment of a rain drop sensor 10 mounted in a stereo optical module.

Figure 26:
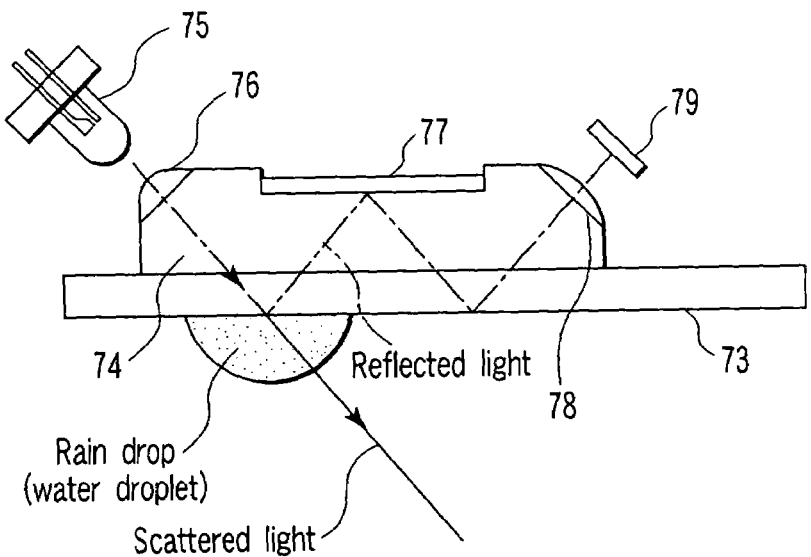
FIG. 26 is a block diagram of a conventional rain drop sensor.

For example, as shown in FIG. 26, a conventional rain drop sensor projects infrared light or visible light from a light emitting diode (a light projecting LED) 75 toward a glass block 74 which is appressed against a window glass 73. This light is concentrated by the light projecting lens 76, and reflected light of this concentrated light ray on a glass outer surface is led to a light receiving lens 78 by a reflecting mirror 77 or the like. Then, the led light is concentrated by the light receiving lens 78, and this concentrated light ray is detected by a light receiving sensor 79 such as a photo diode. At this time, when rain drops have adhered to the window glass 73, since the light is scattered and a light quantity is thereby changed, a quantity of rain drops can be measured.

However, in this conventional rain drop sensor, the rain drop sensor must be attached firmly to a glass surface, which restricts a space or a cost. Furthermore, when the rain drop sensor obstructs a visual field of a driver or a stereo optical module which detects an obstacle or the like ahead of a vehicle is mounted in addition to the rain drop sensor, there is a problem of shielding a visual field of the stereo optical module or a problem of an installation position of the rain drop sensor with respect to the stereo optical module 1.

Thus, the rain drop sensor according to the sixth embodiment detects rain drops by using an image captured by the stereo optical module 1.

Figure 27:
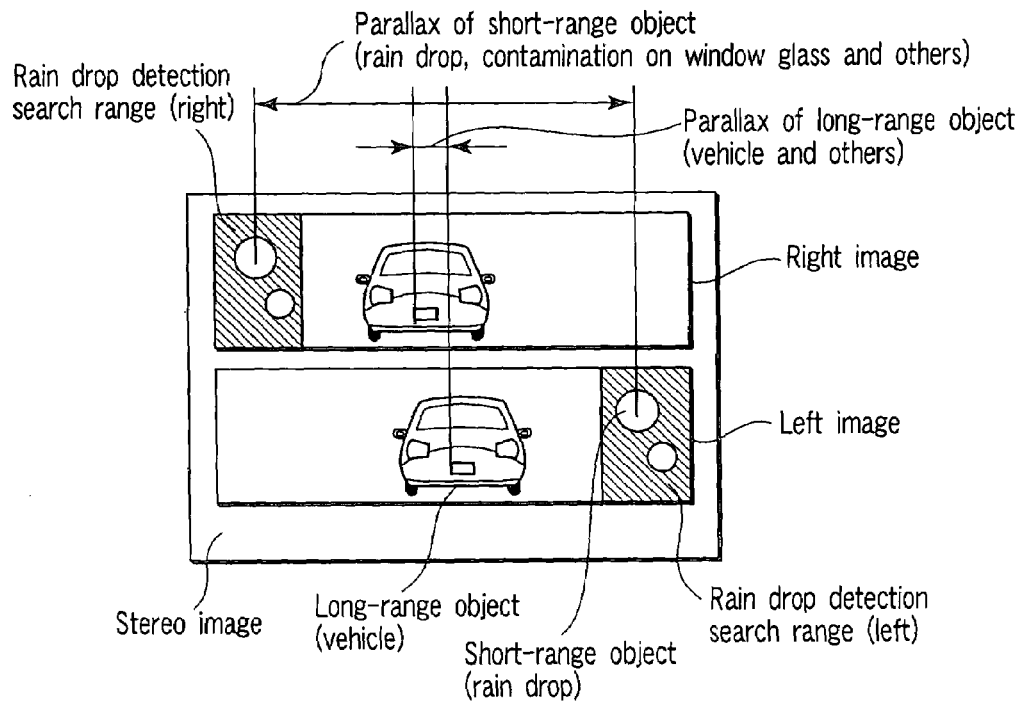
FIG. 27 is a view showing a stereo image example when detecting rain drops as a sixth embodiment of the present invention.

In the stereo optical module 1 described in conjunction with the foregoing embodiments, a stereo optical system which vertically separates right and left parallactic images which are long from side to side and forms them on the imaging element as shown in FIG. 5 is used, thereby obtaining such a horizontally long stereo image as shown in FIG. 27. Here, according to the principle of stereo measurement, generally, a long-distanced object has a small parallax, and a near-distanced object has a large parallax. That is, in the optical system described in conjunction with the foregoing embodiments, since a large measurable parallactic range can be assured, it is possible to cope with a very short range (e.g., a short range of ten centimeters or above to several-ten centimeters with a base length of ten centimeters or above) to an infinitely long range in a region having a stereo image considering the base length as compared with a prior art.

Figure 28:
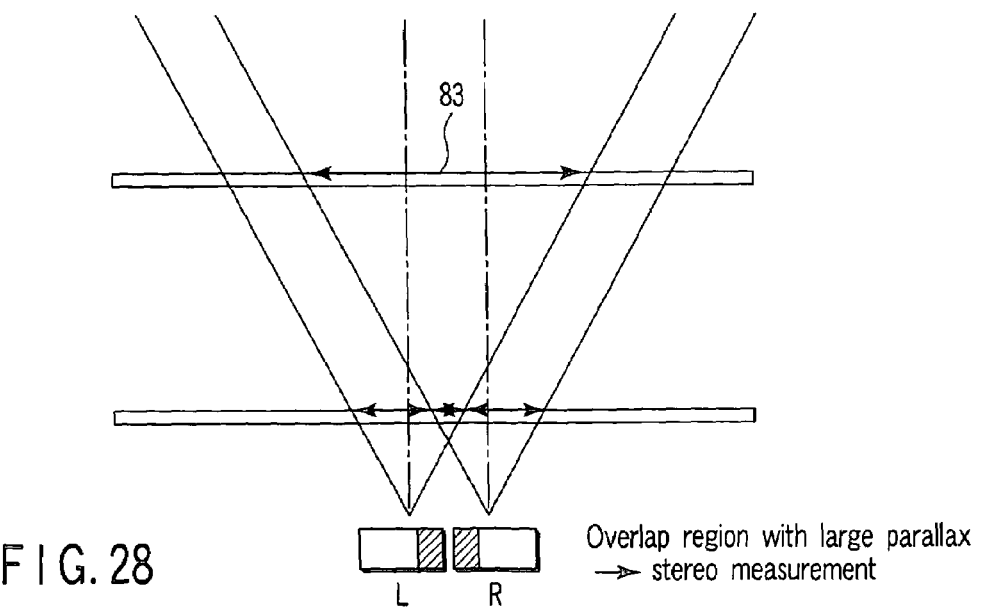
FIG. 28 is a view illustrating an overlap region.

FIG. 28 is a view showing field angles of a stereo image having right and left two viewpoints of the stereo optical module 1 used in the sixth embodiment. That is, in the sixth embodiment, the stereo optical module 1 is arranged in such a manner that at least a window glass of a vehicle as a rain drop detection target enters an overlap region 83 in which field angles of right and left viewpoints overlap. For example, a rain drop detection search range in the example of FIG. 27 is a distance range (shaded parts in the drawing) in which the window glass exists in the overlap region 83 depicted in FIG. 28.

In particular, when an in-vehicle application is considered, a parallactic quantity is small in recognition of an obstacle or the like since a long range, i.e., several meters to several-ten or several-hundred meters is measured. Therefore, in case of performing window matching, generally, a search width of a corresponding point on an epipolar line is shortened in order to increase a speed of processing. It is to be noted that a search width is increased in case of a short range, and hence searching the corresponding point takes time.

However, when window matching is performed in a short range only, especially a region of several-ten centimeters where the window glass exists like the sixth embodiment, a large parallactic quantity can be assured. As an extreme example, searching in a rain detection search range shown in FIG. 27 alone can detect rain drops.

Figure 29:
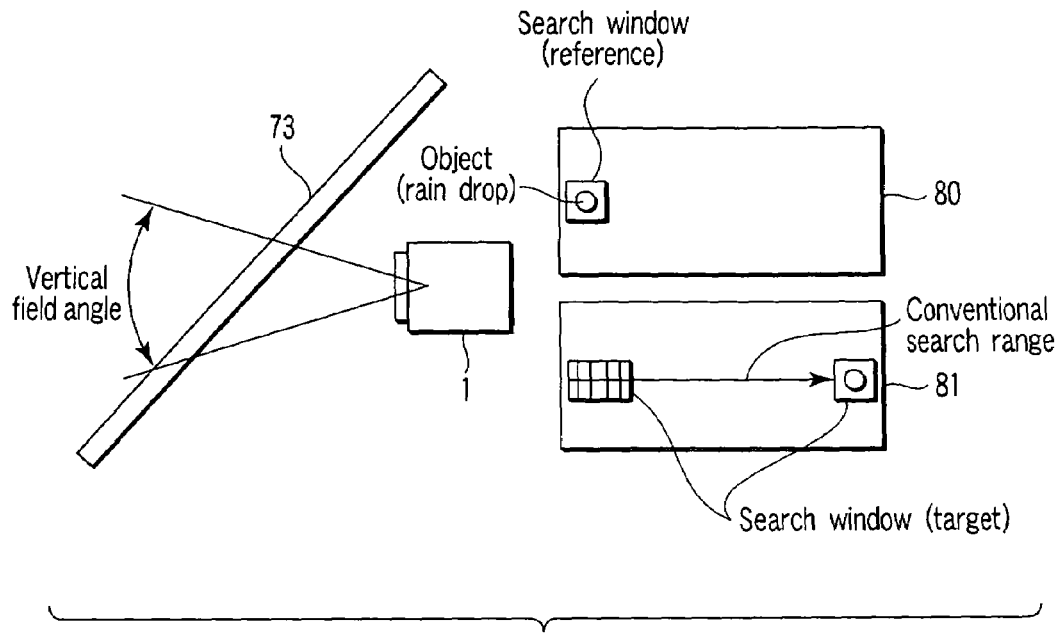
FIG. 29 is a view schematically showing conventional corresponding point retrieval.
Figure 30:
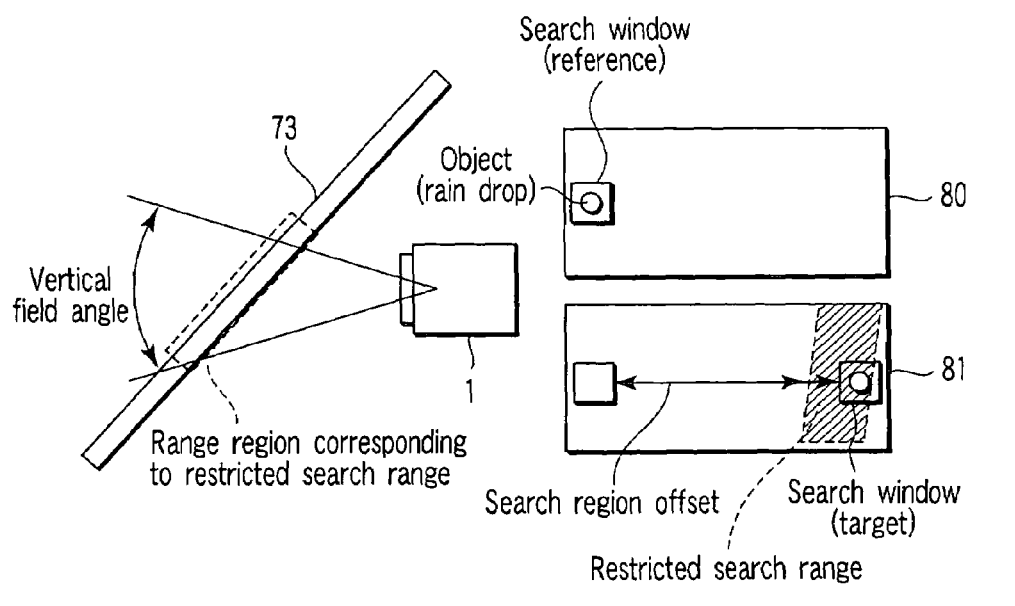
FIG. 30 is a view schematically showing corresponding point retrieval when detecting rain drops in the sixth embodiment.

Giving a description on this in further detail with reference to FIGS. 29 and 30, in a case where objects in a long range to a short range are continuously distance-measured to calculate a range image, window matching must be performed while moving a search window across a screen when search is started from a reference point at a screen end. This takes time in search, which may result in a fatal flaw in an in-vehicle application or the like in which distance measurement is subjected to temporal restriction in particular.

Thus, in the sixth embodiment, a first image evaluation sequence which detects water droplets or rain drops are detected and a second image evaluation sequence which detects an object such as an obstacle or a vehicle are switched as modes. That is, in the mode of detecting water droplets or rain drops, as shown in FIG. 29, window matching is performed in a range corresponding to a short range in a reference image 80. On the other hand, in the mode of detecting an object such as an obstacle or a vehicle, a search range is restricted, and search for a parallactic quantity corresponding to, e.g., 3 m to 100 m is carried out.

Moreover, when rain drops are frequently detected in particular, a search range on a search image 81 side may be restricted to a search range (a shaded part in the drawing) corresponding to a limited distance region including a surface of the window glass 73 (e.g., a narrow region matched with a window shape) as shown in FIG. 30. That is, values in the search range may be offset in such a manner that rain drop search ranges at a left end of a right image and at a right end of a left image are determined as the search range. Restricting the search range in this manner can realize detection of rain drops based on window matching at a higher speed.

Additionally, as shown in FIG. 30, when a search range is also inclined in accordance with an inclination of the window glass 73, since an upper end of the screen has a short range and a lower end of the screen has a longer range than the upper end, window matching may be carried out while reducing an offset quantity of the search range from search on the screen upper end side to search on the screen lower end as indicated by a shaded part in FIG. 30.

As described above, in the sixth embodiment, realizing a function as the rain drop sensor by window matching restricted to a short range can detect rain drops or contamination on the glass without adding a new device to the central control unit 3 or the stereo optical module 1.

Further, distance measurement of a regular obstacle is performed by matching in a range with a small parallax and detection of rain drops is carried out by matching in a range with a large parallax in parallel. Alternatively, the rain drop detection function can be realized while performing distance measurement of an obstacle by performing such matching in a time-sharing manner.

It is to be noted that each structure in this sixth embodiment can be of course modified and changed in many ways.

Figure 31:
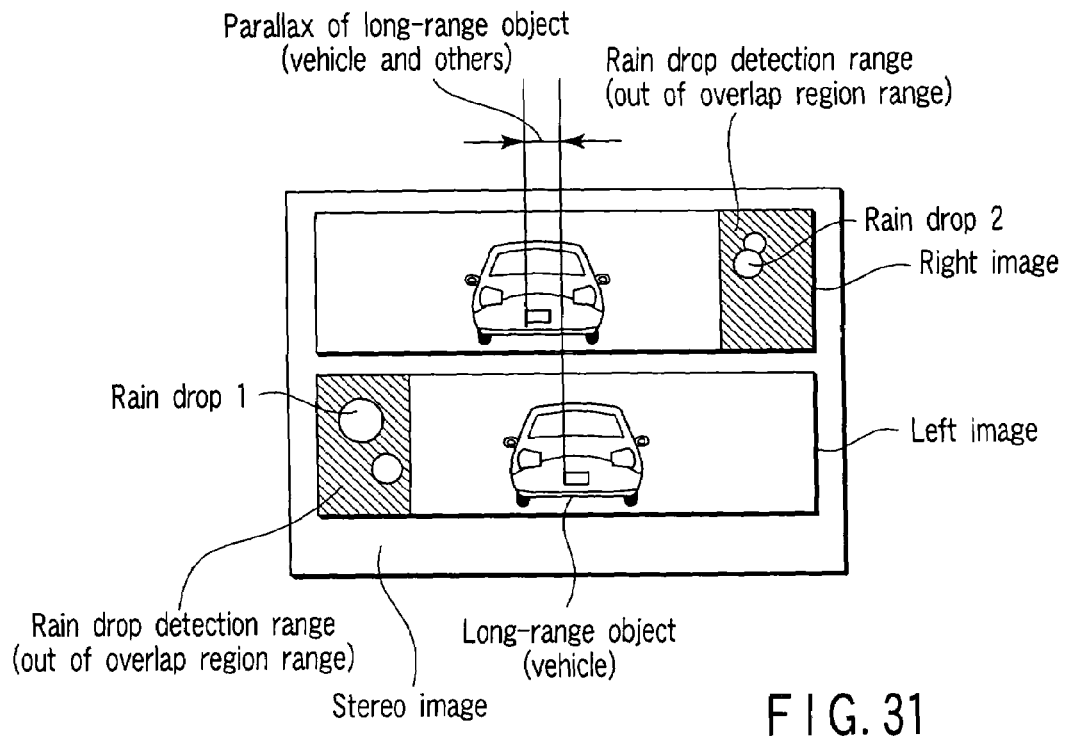
FIG. 31 is a view showing a stereo image example when rain drops have adhered in a region other than the overlap region.
Figure 32:
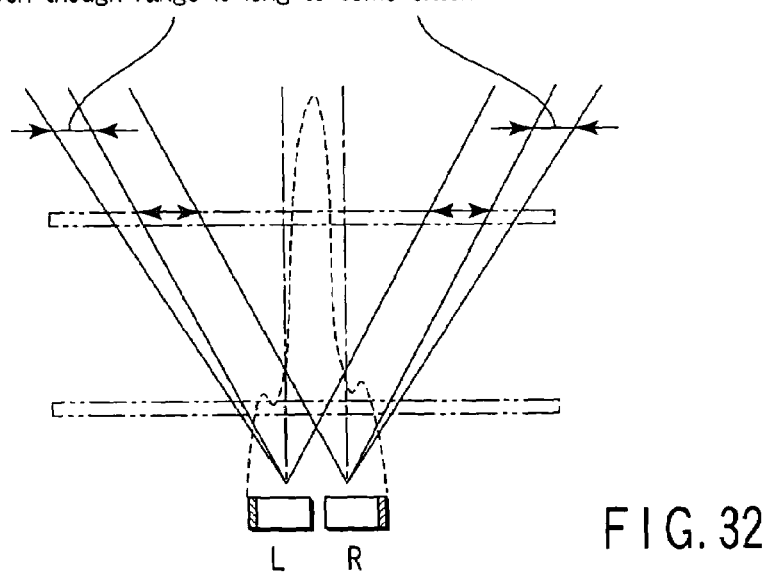
FIG. 32 is a view illustrating a technique of detecting rain drops in a region other than the overlap region.
Figure 33:
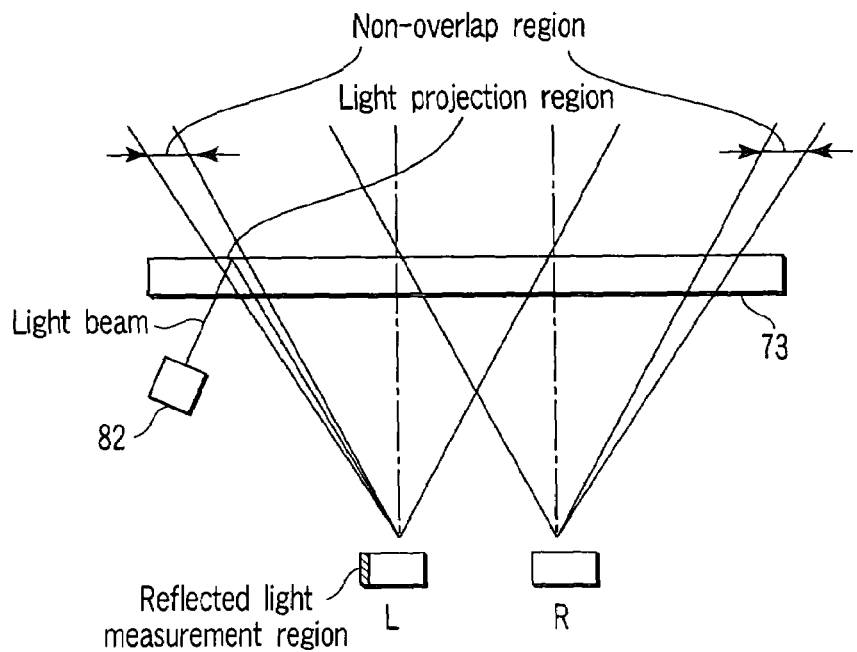
FIG. 33 is a view illustrating detection of rain drops using a light beam projector.

For example, although the description has been given as to the example where a captured image is passively processed in the sixth embodiment, it is possible to use an active mode which emits light having a specific wavelength on the window glass 73 in a fixed cycle and detects rain drops based on scattered light from the rain drops together with the passive mode. In this case, it is good enough to switch rain drop detection and distance measurement in time series and project light in one of right and left visual fields of the stereo optical module. Furthermore, in case of performing parallel processing, it is good enough to shoot as a two-dimensional image an image in a region other than the overlap as shown in FIG. 31 or 32 and project a light beam such as infrared light to the region other than the overlap region from a light beam projector 82 as such a light irradiation device as shown in FIG. 33, thereby detecting rain drops. It is to be noted that overlapping does not occur even in a long range, an angle of convergence may be outwardly opened to set a viewpoint. Moreover, since a region other than the overlap region is not used in stereo measurement, infrared light can be projected to this visual field range only, thereby detecting rain drops.

Figure 34:
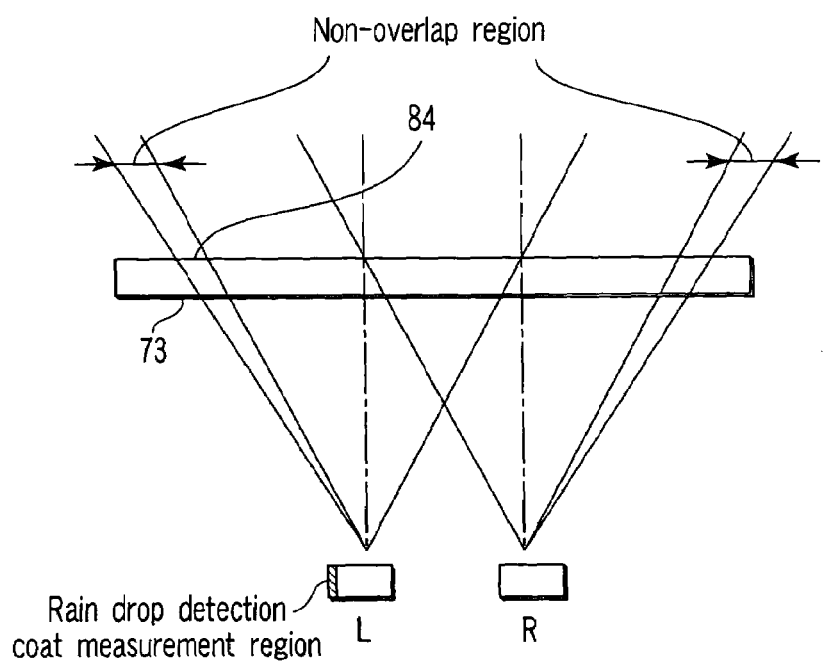
FIG. 34 is a view showing an example of a rain drop detection coating.

Additionally, a rain drop detection coating 84 may be applied on the window glass surface corresponding to the region other than the overlap region as shown in FIG. 34 and, for example, it is good enough to provide a diffusion surface on the surface of the window glass 73 so that a frosted glass can be provided, thereby improving permeability at a part to which rain drops have adhered. Further, a rain drop detection may be performed by, e.g., attaching a coloring sheet for a wetness judgment.

Furthermore, a water-shedding sheet and a hydrophilic sheet may be attached on the window so that presence/absence of rain drops can be further clearly judged.

Moreover, by installing a closeup lens having a positive power in the visual field portion of the visual field mask to cope with shorter range shooting, a focusing region may be restricted to a short range, or at least a range between the window glass surface and the stereo camera system in order to detect rain drops by detection from a two-dimensional image, shooting using infrared light, extraction of a shape, color detection or the like. When these kinds of detection are carried out in a region which is not used for distance measurement, detection of rain drops can be realized by using a single imaging element without adversely affecting distance measurement.

Further, in case of projecting infrared light, further effective measurement can be realized by previously removing an infrared cut filter provided in the imaging element which shoots a region other than the overlap region or substituting a band pass filter for this part.

Furthermore, although the light projection or rain detection coat is applied in a region other than the overlap region in the sixth embodiment, if a screen peripheral portion is not used for distance measuring, the above-described rain drop detecting means can be of course configured with respect to the window glass at the screen periphery corresponding to this part.

It is to be noted that, in each of the foregoing embodiments, a so-called pan-focus stereo optical system which has a range from the vicinity of the window glass to a predetermined distance (e.g., 50 to 300 m) ahead as a depth of field may be configured without providing a focusing mechanism in the stereo optical system. In such a case, even if the focusing mechanism is not provided, it is possible to substantially focus on both rain drops which have adhered to the window glass or attachments and an obstacle ahead, thereby recognizing shapes of both of the attachments and the obstacle at the same time.

Although the above has described the present invention based on the embodiments, the present invention is not restricted to the foregoing embodiments, and various modifications or applications can be of course carried out within the scope of the present invention. Although the in-vehicle stereo camera system has been described in the foregoing embodiments, the present invention can be utilized even in case of performing distance measurement in a mobile body such as a robot.

Moreover, the foregoing embodiments include the invention on various stages, and a wide variety of inventions can be obtained by appropriately combining a plurality of disclosed constituent requirements. For example, the problems described in the section problems to be solved by the invention can be solved even if some of constituent requirements disclosed in the embodiments are deleted and, a configuration in which this configuration requirement is deleted can be also provided as the present invention when the effects described in the section effects of the invention can be obtained.

What is claimed is:

1. A stereo camera system which shoots object images seen from a plurality of viewpoints with respect to the same object to obtain a distance to the object as a target, comprising:
a stereo optical module which acquires a stereo image;
a central control unit which evaluates the object as a target based on the stereo image acquired by the stereo optical module; and
a communication line through which data concerning the stereo image acquired by the stereo optical module is input to the central control unit,
the stereo optical module being configured as an integral unit and comprising: a stereo optical system which generates object images seen from a plurality of viewpoints with respect to the same object; an imaging element which generates stereo image data based on the object images produced by the stereo optical system; an analog-to-digital converting section which subjects the stereo image data generated by the imaging element to analog-to-digital conversion to produce digital stereo image data; a correction information memory which stores calibration data; an image output processing circuit which performs predetermined image processing with respect to the digital stereo image data generated by the analog-to-digital converting section, the predetermined image processing including rectification processing for correcting distortion of an image due to displacement of an epipolar line of right and left images generated by mechanical displacement of an optical member or distortion of a lens; a range image calculation unit which generates range image data based on stereo image data subjected to the image processing by the image output processing circuit; and a module side communication interface which outputs the range image data generated by the range image calculation unit to the communication line, and the central control unit comprising: a unit side communication interface which inputs the range image data output through the module side communication interface; and a range image evaluation device which evaluates the object based on the range image data input through the unit side communication interface.

2. The stereo camera system according to claim 1, wherein the image output processing circuit includes a shading correction processing circuit which performs shading correction processing with respect to the digital stereo image data generated by the analog-to-digital converting section.

3. The stereo camera system according to claim 1, wherein the module side communication interface outputs the range image data as digital image data to the communication line.

4. The stereo camera system according to claim 3, wherein the module side communication interface performs data compression with respect to the range image data, and then outputs the compressed data as digital data to the communication line.

5. The stereo camera system according to claim 1, wherein the module side communication interface outputs the range image data as analog image data to the communication line.

6. The stereo camera system according to claim 1, wherein the range image evaluation device recognizes an obstacle ahead of the stereo camera system as an evaluation of the object, and judges a distance to the obstacle based on a result of the recognition.

7. The stereo camera system according to claim 1, wherein the range image evaluation device recognizes an automobile traveling ahead of the stereo camera system as an evaluation of the object, and judges a distance to the automobile based on a result of the recognition.

8. The stereo camera system according to claim 1, wherein the range image evaluation device recognizes a white line of a road ahead of the stereo camera system as an evaluation of the object.

9. The stereo camera system according to claim 1, wherein the central control unit further has a driving support device which supports driving of a mobile body in which the stereo camera system is mounted.

10. The stereo camera system according to claim 1, wherein the central control unit further has an information input device which inputs information from the outside of the stereo camera system.

11. A stereo optical module configured as an integral unit for use in a stereo camera system which shoots object images seen from a plurality of viewpoints with respect to the same object to obtain a distance to the object as a target, the stereo camera system comprising: the stereo optical module which acquires a stereo image; a central control unit which evaluates the object as a target based on the stereo image acquired by the stereo optical module; and a communication line through which data concerning the stereo image output from the stereo optical module is input to the central control unit, the stereo optical module comprising:
a stereo optical system which generates object images seen from a plurality of viewpoints with respect to the same object;

an imaging element which generates stereo image data based on the object images generated in the stereo optical system;

an analog-to-digital converting section which subjects the stereo image data generated by the imaging element to analog-to-digital conversion to generate digital stereo image data;

a correction information memory which stores calibration data;

an image output processing circuit which performs predetermined image processing with respect to the digital stereo image data generated by the analog-to-digital converting section, the predetermined image processing including rectification processing for correcting distortion of an image due to displacement of an epipolar line of right and left images generated by mechanical displacement of an optical member or distortion of a lens;

a range image calculation unit which generates range image data based on stereo image data subjected to the image processing by the image output processing circuit; and a module side communication interface which outputs the range image data generated by the range image calculation unit to the communication line.

12. The stereo optical module according to claim 11, wherein the image output processing circuit includes a shading correction processing circuit which performs shading correction processing with respect to the digital stereo image data generated by the analog-to-digital converting portion.

13. The stereo optical module according to claim 11, wherein the module side communication interface outputs the range image data as digital image data to the communication line.

14. The stereo optical module according to claim 13, wherein the module side communication interface subjects the range image data to data compression, and then outputs the compressed data as digital data to the communication line.

15. The stereo optical module according to claim 11, wherein the module side communication interface outputs the range image data as analog image data to the communication line.

16. A stereo camera system which shoots object images seen from a plurality of viewpoints with respect to the same object to obtain a distance to the object as a target, comprising:

a stereo optical module which is configured as an integral unit and comprises: a stereo optical system which generates object images seen from a plurality of viewpoints with respect to the same object; an imaging element which generates stereo image data based on the object images generated by the stereo optical system; an analog-to-digital converting section which subjects the stereo image data generated by the imaging element to analog-to-digital conversion by the imaging element to generate digital stereo image data; a correction information memory which stores calibration data; an image output processing circuit which performs predetermined image processing with respect to the digital stereo image data generated by the analog-to-digital converting section, the predetermined image processing including rectification processing for correcting distortion of an image due to displacement of an epipolar line of right and left images generated by mechanical displacement of an optical member or distortion of a lens; a range image calculation unit which generates range image data based on stereo image data subjected to image processing by the image output processing circuit; and a module side communication interface which outputs at least one of the range image data generated by the range image calculation unit and the stereo image data;

a central control unit which comprises: a unit side communication interface which inputs at least one of the range image data and the stereo image data; and a range image evaluation device which evaluates the object based on at least one of the range image data and the stereo image data input through the unit side communication interface; and a communication line which connects the module side communication interface with the unit side interface to enable data communication between the stereo optical module and the central control unit.

17. The stereo camera system according to claim 16, wherein the module side communication interface outputs at least one of the range image data and the stereo image data as digital image data to the communication line.

18. The stereo camera system according to claim 17, wherein the module side communication interface subjects at least one of the range image data and the stereo image data to data compression, and then outputs the compressed data as digital data to the communication line.

19. The stereo camera system according to claim 16, wherein the module side communication interface outputs at least one of the range image data and the stereo image data as analog image data to the communication line.

20. The stereo camera system according to claim 19, wherein the module side communication interface allocates image data seen from any viewpoint in a stereo image acquired from the plurality of viewpoints to a first region in image data of one frame, allocates the range image data to a second region different from the first region in the image data of the one frame, and outputs the image data to the communication line.

21. The stereo camera system according to claim 16, wherein the central control unit further has displaying section configured to display image data seen from any viewpoint in a stereo image acquired from the plurality of viewpoints.

22. A stereo optical module configured as an integral unit and comprising:

a stereo optical system which generates object images seen from a plurality of viewpoints with respect to the same object;

an imaging element which generates stereo image data based on the object images generated by the stereo optical system;

an analog-to-digital converting section which subjects the stereo image data generated by the imaging element to analog-to-digital conversion to produce digital stereo image data;

a correction information memory which stores calibration data;

an image output processing circuit which performs predetermined image processing with respect to the digital stereo image data generated by the analog-to-digital converting section, the predetermined image processing including rectification processing for correcting distortion of an image due to displacement of an epipolar line of right and left images generated by mechanical displacement of an optical member or distortion of a lens;

a range image calculation unit which generates range image data based on stereo image data subject to the image processing by the image output processing circuit; and a module side communication interface which outputs at least one of the range image data generated by the range image calculation unit and the stereo image data generated by the imaging element to the communication line.

23. The stereo optical module according to claim 22, wherein the module side communication interface outputs at least one of the range image data and the stereo image data as digital image data to the communication line.

24. The stereo optical module according to claim 22, wherein the module side communication interface subjects at least one of the range image data and the stereo image data to data compression, and then outputs the compressed data as digital data to the communication line.

25. The stereo optical module according to claim 22, wherein the module side communication interface outputs at least one of the range image data and the stereo image data as analog image data to the communication line.

26. The stereo optical module according to claim 22, wherein the module side communication interface allocates image data seen from any viewpoint in stereo image acquired from the plurality of viewpoints to a first region in image data of one frame, allocates the range image data to a second region different from the first region in the image data of the one frame, and outputs the image data to the communication line.

* * * * *